(12) United States Patent
Deguchi

(10) Patent No.: US 9,170,743 B2
(45) Date of Patent: Oct. 27, 2015

(54) MANAGEMENT METHOD OF VIRTUAL STORAGE SYSTEM AND REMOTE COPY SYSTEM

(71) Applicant: HITACHI, LTD., Tokyo (JP)

(72) Inventor: Akira Deguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/584,038

(22) Filed: Dec. 29, 2014

(65) Prior Publication Data

US 2015/0121005 A1   Apr. 30, 2015

Related U.S. Application Data

(63) Continuation of application No. 13/600,644, filed on Aug. 31, 2012, now Pat. No. 8,935,496.

(51) Int. Cl.
| | |
|---|---|
| *G06F 12/16* | (2006.01) |
| *G06F 3/06* | (2006.01) |
| *G06F 9/50* | (2006.01) |
| *G06F 11/14* | (2006.01) |
| *G06F 11/20* | (2006.01) |

(52) U.S. Cl.
CPC ............ *G06F 3/0619* (2013.01); *G06F 3/0665* (2013.01); *G06F 3/0689* (2013.01); *G06F 9/5027* (2013.01); *G06F 11/1456* (2013.01); *G06F 11/2058* (2013.01); *G06F 11/2056* (2013.01); *G06F 11/2074* (2013.01); *G06F 11/2076* (2013.01); *G06F 2201/815* (2013.01); *G06F 2201/855* (2013.01)

(58) Field of Classification Search
None
See application file for complete search history.

(56) References Cited

U.S. PATENT DOCUMENTS

| | | | |
|---|---|---|---|
| 6,526,419 | B1 | 2/2003 | Burton et al. |
| 7,680,919 | B2 | 3/2010 | Nelson |
| 2006/0085610 | A1 | 4/2006 | Iwamura et al. |
| 2006/0161721 | A1 | 7/2006 | Iwamura et al. |
| 2006/0179218 | A1 | 8/2006 | Burkey |
| 2007/0079088 | A1 | 4/2007 | Deguchi et al. |
| 2008/0034005 | A1 | 2/2008 | Satoyama et al. |
| 2011/0208839 | A1 | 8/2011 | Oeda |

OTHER PUBLICATIONS

European Search Report received in European Application No. 13154184 dated Jan. 29, 2014.

*Primary Examiner* — Duc Doan
(74) *Attorney, Agent, or Firm* — Mattingly & Malur, PC

(57) ABSTRACT

Exemplary embodiments provide techniques of managing storage systems including remote copy systems and improving the manageability by automating complicated operations. In one embodiment, a computer comprises a memory and a controller. The controller is operable to: manage a virtual volume to be provided for a server; manage a plurality of logical volumes provided from a plurality of storage systems; manage a condition to be required of the virtual volume, the condition relating to a location in which data to be sent to the virtual volume is stored; manage location information of each of the plurality of logical volumes, the location information of a logical volume being defined based on a location of the logical volume; and control to map the virtual volume to a logical volume of the plurality of logical volumes, based on the condition of the virtual volume and the location information of the logical volumes.

20 Claims, 30 Drawing Sheets

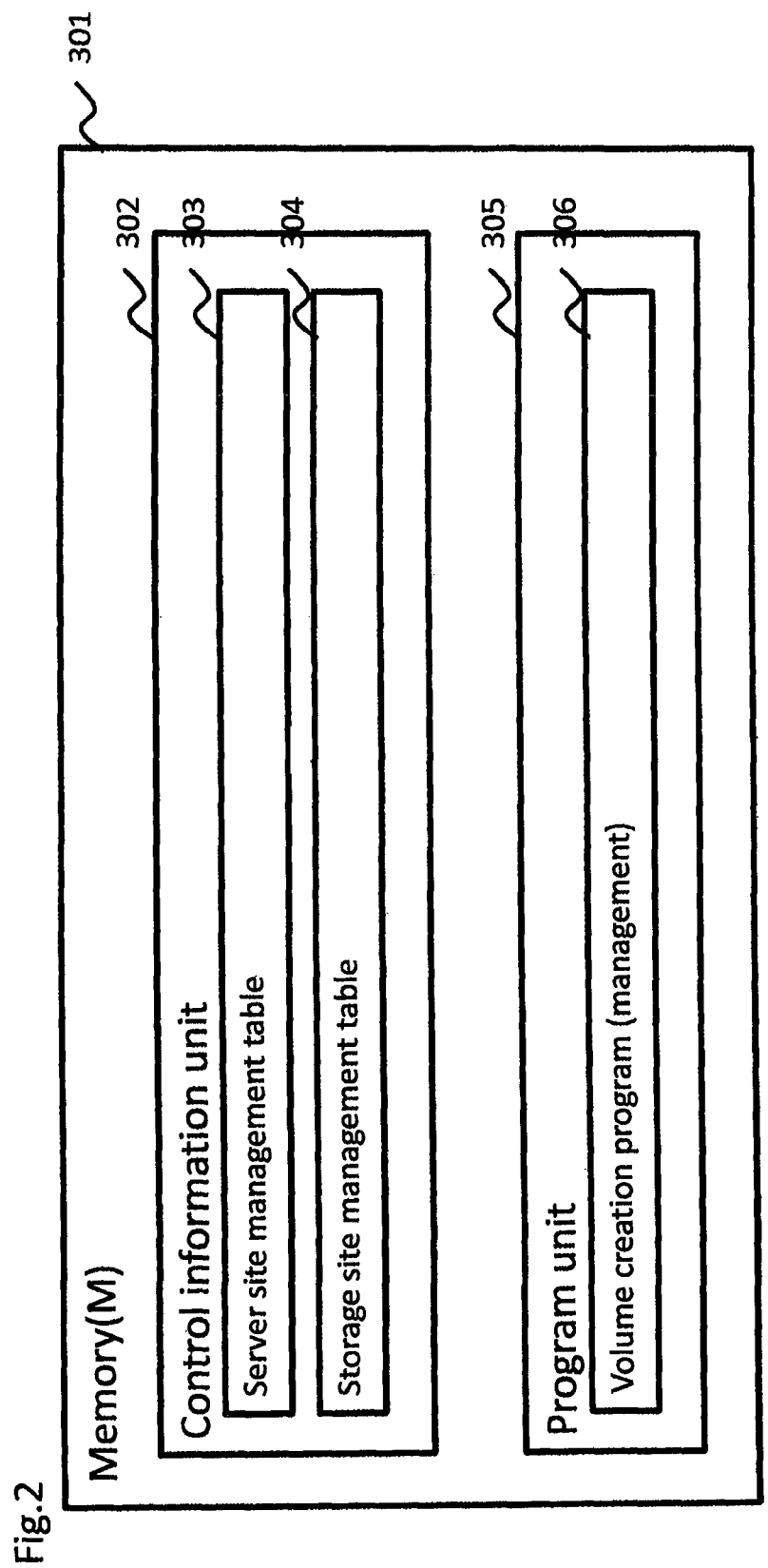

Fig.4

| PDKC ID | Site ID |
|---------|---------|
| 0 | 0 |
| 1 | 0 |
| 2 | 1 |
| 3 | 1 |
| ... | ... |

| Server ID | Site ID |
|-----------|---------|
| 0 | 0 |
| 1 | 0 |
| 2 | 0 |
| 3 | 0 |
| ... | ... |

| Global Volume ID | PDKC ID | Local Volume ID | Volume Size |
|---|---|---|---|
| 0 | 0 | 0 | 500GB |
| 1 | 0 | 1 | 800GB |
| 2 | 2 | 0 | 300GB |
| 3 | 3 | 5 | 500GB |
| ... | ... | ... | ... |

| Primary Volume ID | Secondary PDKC ID | Secondary Volume ID |
|---|---|---|
| 0 | 2 | 0 |
| 1 | 2 | 10 |
| 2 | 3 | 3 |
| 3 | 3 | 6 |
| ... | ... | ... |

| Secondary Volume ID | Primary PDKC ID | Primary Volume ID |
|---|---|---|
| 0 | 0 | 0 |
| 1 | 0 | 9 |
| 2 | 0 | 12 |
| 3 | 0 | 5 |
| ... | ... | ... |

| Local Volume ID | Inflow |
|---|---|
| 0 | 5MB/s |
| 1 | 3MB/s |
| 2 | 10MB/s |
| ... | ... |

| Site ID | Site ID | Distance |
|---|---|---|
| 0 | 1 | 100km |
| 0 | 2 | 1000km |
| 0 | 3 | 300km |
| 1 | 2 | 900km |
| 1 | 3 | 200km |
| ... | ... | ... |

307

MANAGEMENT METHOD OF VIRTUAL STORAGE SYSTEM AND REMOTE COPY SYSTEM

RELATED APPLICATIONS

The present application is a continuation of U.S. patent application Ser. No. 13/600,644, filed Aug. 31, 2012, which is incorporated herein by reference in its entirety.

BACKGROUND OF THE INVENTION

The present invention relates generally to storage systems and, more particularly, to remote copy systems and the ease of use of technology of remote copy systems.

US 2007/0079088 discloses technology to provide the server with one virtualized storage which has one or more physical storage systems connected mutually. In particular, the technology realizes the use of the resource of other physical storage systems by connecting with each other. Furthermore, the unique ID for storage area (volume) is provided in a virtualized storage system (one or more physical storage systems). The unique ID is called global volume ID. Thus, even if a volume is moved between physical storage systems, the volume ID which is provided to the server is not changed.

US 2008/0034005 discloses virtual storage systems. Many products of storage systems have remote copy functionality for disaster recovery. The remote copy functionality copies the data stored in a primary storage system to a secondary storage system. An operator has to do preparation for the secondary physical storage system, including creating copy destination volume, remote copy path configuration, and the like before initializing remote copy.

U.S. Pat. No. 7,680,919 discloses technology relating to virtual servers. This is a technology to create one or more virtual servers on one physical machine. Moreover, the patent discloses technology to move the virtual server between physical servers.

A volume creation in the conventional virtualized storage system is operated in the order of volume creation in the physical storage system with local volume ID, setting of global volume ID, and providing the volume to the server. As such, an operator has to be aware of the physical storage system for configuration. A technology to determine a physical storage area automatically is not provided based on specified global volume ID. Therefore, the operation cost is high. Furthermore, since it does not take into consideration virtualized storage system beyond the data center (DC), there is no technology which chooses the physical storage system installed in an optimal data center (for example, physical storage system installed in the same datacenter in which the server is installed). If the conventional virtualized storage system is applied to the multiple data center environment, the processing beyond DCs will occur. This causes performance degradation and consumes the network resource between DCs.

The conventional remote copy is configured using two sets of storage systems. Therefore, when applying the conventional remote copy to the virtualized storage system environment simply, the remote copy is configured using two sets of virtualized storage systems. In this case, settings of remote copy are needed for two sets of virtualized storage system. In particular, the settings include wire connection between physical storage system, a setup of I/F (interface) for data transfer, creation of copy destination volume, recognition of volume ID of copy destination, and the like. If virtualized storage system environment beyond data center is realized, remote copy functionality can serve as local copy functionality in that environment. Further, wire connection and a set up of I/F for remote copy will become unnecessary if there is connection for virtualized storage system. In addition, creation of copy destination volume will become unnecessary if the storage system automatically creates the volume by using virtual volume technology. Also, recognition of copy destination volume ID will become unnecessary if IDs of copy source volume and copy destination are made the same.

BRIEF SUMMARY OF THE INVENTION

Exemplary embodiments of the invention provide techniques of managing storage systems including remote copy systems and improving the manageability by automating complicated operations.

A first embodiment is directed to a method to create a volume in a virtual storage system. Specifically, the technique assigns physical storage capacity from the physical storage system installed in the same datacenter in which the server is installed.

A second embodiment is directed to the configuration method of automatic remote copy environment. Once a remote copy attribute is set up for the volume which a server uses, the storage system automatically acquires resources required for remote copy processing, such as copy destination volume (secondary volume, SVOL) or bandwidth between storage systems. Moreover, Volume ID of copy source volume (primary volume, PVOL) and Volume ID of SVOL provided to the server are made the same. At the time of PVOL failure, I/O processing could be restarted by only changing the I/O path from PVOL to SVOL. Since it is not necessary to change the I/O processing to SVOL with another ID as in the conventional technology, there is no influence on application. Moreover, failure recovery processing of the server in one storage configuration and the processing in multi storage configuration can be made the same.

A third embodiment is directed to the automatic recovery method of remote copy and the method of applying the above technologies to three data center remote copy configuration.

In accordance with an aspect of the present invention, a computer comprises a memory and a controller. The controller is operable to: manage a virtual volume to be provided for a server; manage a plurality of logical volumes provided from a plurality of storage systems; manage a condition to be required of the virtual volume, the condition relating to a location in which data to be sent to the virtual volume is stored; manage location information of each of the plurality of logical volumes, the location information of a logical volume being defined based on a location of the logical volume; and control to map the virtual volume to a logical volume of the plurality of logical volumes, based on the condition of the virtual volume and the location information of the logical volumes.

In some embodiments, the condition requires that the location in which data to be sent to the virtual volume is stored is at a site, which is the same site in which the server for which the virtual volume is provided is located; and the location in which data to be sent to the virtual volume is stored is the location of the logical volume which is mapped to the virtual volume. The virtual volume is mapped to a primary logical volume which is mapped to a secondary logical volume, the primary logical volume and the secondary logical volume being a remote copy pair and being at different locations. The controller is operable to automatically map the primary logical volume to the secondary logical volume based on the location information of the logical volumes, a condition to be required of the secondary logical volume, and site distance information of distances between sites in which the plurality of logical volumes are located, the condition to be required of the secondary logical volume including at least one of free capacity or connectivity with respect to the primary logical volume. The controller is operable to automatically create a primary journal volume for storing a journal of the primary logical volume and create a secondary journal volume, copy the journal from the primary journal volume to the secondary journal volume, and copy the journal from the secondary journal volume to the secondary logical volume to achieve asynchronous remote copy.

In specific embodiments, the primary logical volume is mapped to the secondary logical volume and a tertiary logical volume, the primary logical volume, the secondary logical volume, and the tertiary logical volume having a remote copy relationship and being at three different locations. The controller is operable to automatically map the primary logical volume to the secondary logical volume and the tertiary logical volume based on the location information of the logical volumes, a condition to be required of the secondary logical volume, a condition to be required of the tertiary logical volume, and site distance information of distances between sites in which the plurality of logical volumes are located, the condition to be required of the secondary logical volume including at least one of free capacity or connectivity with respect to the primary logical volume, the condition to be required of the tertiary logical volume including at least one of free capacity or connectivity with respect to the secondary logical volume if the remote copy is cascading remote copy or connectivity with respect to the primary logical volume if the remote copy is not cascading remote copy.

In some embodiments, the controller is operable, upon I/O (Input/Output) failure with the primary logical volume, to automatically change I/O from an I/O path between the server and the primary logical volume to another I/O path between the server and the secondary logical volume; and a status of the secondary logical volume is changed from I/O non-receivable to I/O receivable.

In specific embodiments, the controller is operable, upon I/O (Input/Output) failure with the primary logical volume, to automatically migrate virtual machine for running an application that uses the data from the server to a destination server, and change I/O from an I/O path between the server and the primary logical volume to another I/O path between the destination server and the secondary logical volume; and a status of the secondary logical volume is changed from I/O non-receivable to I/O receivable.

In some embodiments, the controller is operable, upon I/O (Input/Output) failure with the primary logical volume, to automatically map the secondary logical volume to an automatic recovery secondary logical volume as an automatic recovery remote copy pair, based on the location information of the logical volumes, a condition to be required of the automatic recovery secondary logical volume, and site distance information of distances between sites in which the plurality of logical volumes are located, the condition to be required of the automatic recovery secondary logical volume including at least one of free capacity or connectivity with respect to the secondary logical volume.

In specific embodiments, the virtual volume is mapped to a primary logical volume in a primary consistency group having one or more primary logical volumes, and the primary consistency group is mapped to a secondary consistency group having one or more secondary logical volumes, the primary consistency group and the secondary consistency group providing one or more remote copy pairs and being at different locations. The controller is operable to automatically map the primary logical volume in the primary consistency group to a secondary logical volume in the secondary consistency group, based on the location information of the logical volumes, a condition to be required of the secondary logical volume, and site distance information of distances between sites in which the plurality of logical volumes are located, the condition to be required of the secondary logical volume including at least one of free capacity or connectivity with respect to the primary logical volume.

In accordance with another aspect of the invention, a system comprises a computer and a plurality of storage systems, the computer including a memory and a controller. The controller is operable to: manage a virtual volume to be provided for a server; manage a plurality of logical volumes provided from the plurality of storage systems; manage a condition to be required of the virtual volume, the condition relating to a location in which data to be sent to the virtual volume is stored; manage location information of each of the plurality of logical volumes, the location information of a logical volume being defined based on a location of the logical volume; and control to map the virtual volume to a logical volume of the plurality of logical volumes, based on the condition of the virtual volume and the location information of the logical volumes.

In some embodiments, the virtual volume is mapped to a primary logical volume which is mapped to a secondary logical volume, the primary logical volume and the secondary logical volume being a remote copy pair and being at different locations. The controller is operable, upon I/O (Input/Output) failure with the primary logical volume, to automatically migrate virtual machine for running an application that uses the data from the server to a destination server, and change I/O from an I/O path between the server and the primary logical volume to another I/O path between the destination server and the secondary logical volume. The storage system which provides the secondary logical volume is configured to change a status of the secondary logical volume from I/O non-receivable to I/O receivable.

Another aspect of this invention is directed to a computer-readable storage medium storing a plurality of instructions for controlling a data processor to manage data storage. The plurality of instructions comprise: instructions that cause the data processor to manage a virtual volume to be provided for a server; instructions that cause the data processor to manage a plurality of logical volumes provided from a plurality of storage systems; instructions that cause the data processor to manage a condition to be required of the virtual volume, the condition relating to a location in which data to be sent to the virtual volume is stored; instructions that cause the data processor to manage location information of each of the plurality of logical volumes, the location information of a logical volume being defined based on a location of the logical volume; and instructions that cause the data processor to control to map the virtual volume to a logical volume of the plurality of logical volumes, based on the condition of the virtual volume and the location information of the logical volumes.

These and other features and advantages of the present invention will become apparent to those of ordinary skill in the art in view of the following detailed description of the specific embodiments.

BRIEF DESCRIPTION OF THE DRAWINGS

FIG. 2 is a detailed block diagram showing an example of the memory (M) in the management server in accordance with the first embodiment.

FIG. 3 is an example of a server site management table managed in the management server.

FIG. 4 is an example of a storage site management table managed in the management server.

FIG. 6 is an example of a global ID management table managed in the physical storage system.

FIG. 12 is an example of a primary storage pair table in the memory (S) of the physical storage system.

FIG. 13 is an example of a secondary storage pair table in the memory (S) of the physical storage system.

FIG. 14 is an example of an inflow table managed in the physical storage system.

FIG. 15 is an example of a site distance table managed in the management server.

DETAILED DESCRIPTION OF THE INVENTION

Figure 1:
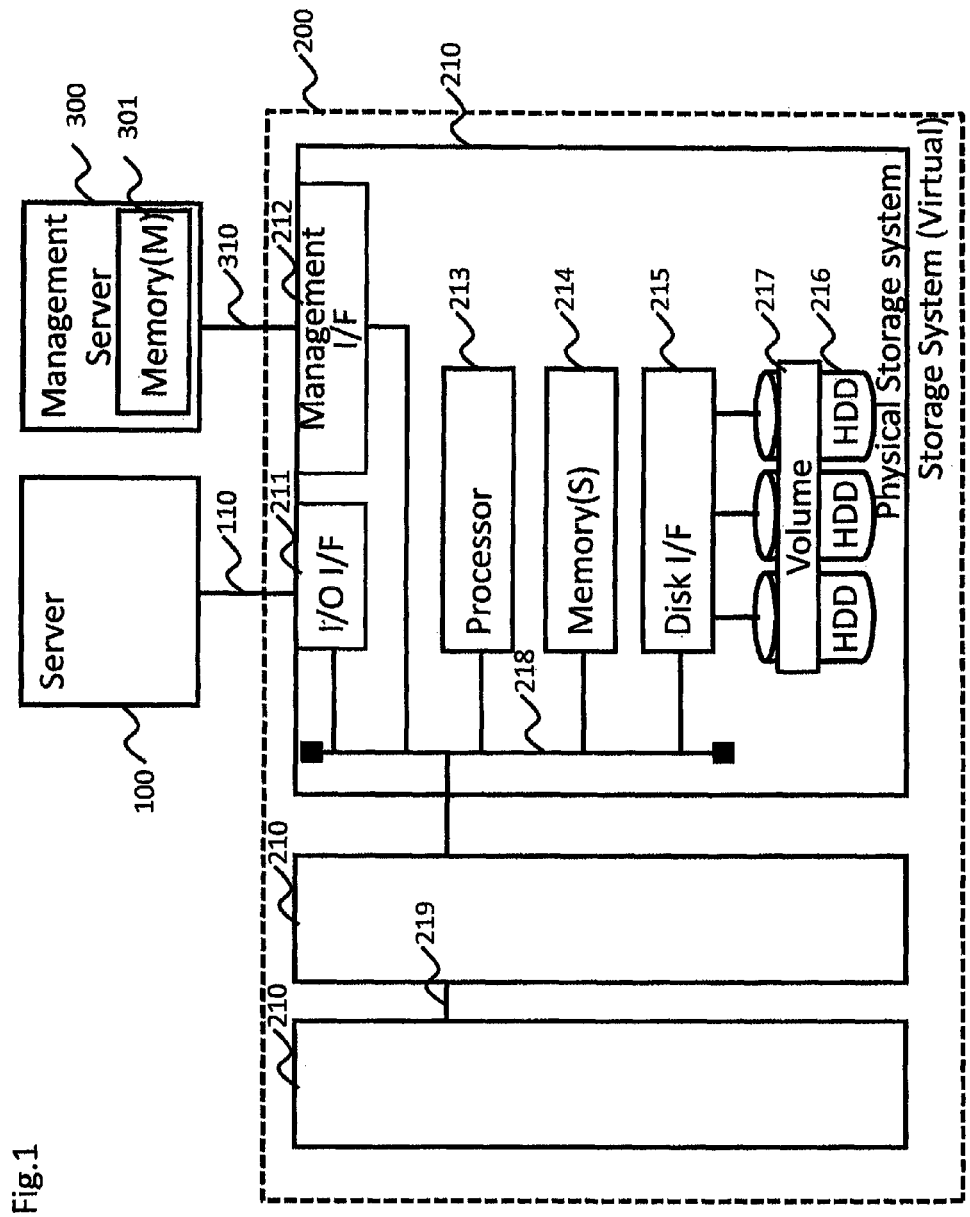
FIG. 1 illustrates an example of a hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing storage systems including remote copy systems and improving the manageability by automating complicated operations.

In the following, the processing will be described while a "program" is handled as a subject in some cases. In the case in which the program is executed by a processor, the predetermined processing is executed. Consequently, a subject of a processing can also be a processor. The processing that is disclosed while a program is handled as a subject can also be a processing that is executed by a processor that executes the program or an apparatus that is provided with the processor (for instance, a control device, a controller, and a storage system). Moreover, a part or a whole of a processing that is executed when the processor executes a program can also be executed by a hardware circuit as substitute for or in addition to a processor.

First Embodiment

FIG. 1 illustrates an example of a hardware configuration of a system in which the method and apparatus of the invention may be applied. The system includes a server 100, a management server 300, and one or more physical storage systems 210 (PDKC) forming a virtual storage system 200.

The server has a CPU, a memory, I/O (Input/Output) I/F, and so on. The server provides service by executing an operating system and software such as a database management system. The data processed by the database management system is stored in the storage system 200. The server 100 is coupled to the storage system 200 via a network 110.

The management server 300 that is configured to manage the storage system 200 is coupled to the storage system 200 via a network 310. The management server 300 is provided with a CPU, a memory (M) 301, an input/output part, and a management I/F. The memory (M) 301 stores programs for management. The CPU executes the management program to execute a management processing. The input/output part is configured by a mouse, a keyboard, a display, and so on, for instance. The input/output part receives a wide variety of instruction inputs from an operator who carries out the management, and displays a wide variety of information on a display. The management port mediates a communication with the storage system 200. The management server 300 might be connected to the server 100 and could also manage the server 100.

In the physical storage system 210, an I/O I/F 211 is coupled to the server 100 via the network 110, and mediates a communication with the server 100. A management I/F 212 is coupled to the management server 300 via the network 310, and mediates a communication with the management server 300. A processor 213 executes a wide variety of processing by executing a wide variety of programs that have been stored into a program unit 2143 of a memory (S) 214. Moreover, the processor 213 executes a wide variety of processing by using a wide variety of information that has been stored into a control information unit 2141 of the memory (M) 214. The memory unit (S) 214 is configured by at least one memory device, for instance, and is provided with a control information unit 2141 that is configured to store the control information, a program unit 2143 that is configured to store programs, and a cache unit 2145 as an example of a cache memory that is configured to cache data, for instance. A capacity of the cache part 2145 is smaller than that of a volume 217 in general. A disk I/F 215 is coupled to at least one HDD 216 as an example of a physical storage device via a bus. The volume 217 that is configured to manage data is configured by at least one storage region of the HDD 216 for instance. The physical storage device is not restricted to an HDD and can also be an SSD (Solid State Drive) or a DVD, for instance. Moreover, at least one HDD 216 can be collected up in a unit of a parity group, and a high reliability technique such as a RAID (Redundant Arrays of Independent Disks) can also be used. The physical storage system 210 may have one or more of the above resources. These resources are connected to each other via an internal bus 218.

In the virtual storage system 200, the physical storage systems 210 are connected to each other via a network 219. The network 219 could be multiplexed for redundancy. Two or more physical storage systems 210 connected mutually is provided as one storage system (virtual storage system) 200 to the server 100. To achieve virtualization of the physical storage systems 210, a unique volume ID allocation method and resource sharing technology between two or more physical storage system 210 are needed. Such technology is known.

FIG. 2 is a detailed block diagram showing an example of the memory (M) 301 in the management server 300 in accordance with the first embodiment. A control information unit 302 contains a server site management table 303 and a storage site management table 304. These tables store the information used by the processing explained later. Details of these tables are shown in FIG. 3 and FIG. 4. The server and storage in the same data center can be detected using these tables. A program unit 305 contains a volume creation program (management) 306 to direct the volume creation to the storage system 200.

FIG. 3 is an example of a server site management table 303 managed in the management server 300. Server ID is an identification to identify the server uniquely in the computer system. Site ID is an identification to identify the site (Data Center) uniquely in the computer system.

FIG. 4 is an example of a storage site management table 304 managed in the management server 300. PDKC ID is an identification to identify the physical storage uniquely in the computer system. Site ID is an identification to identify the site (Data Center) uniquely in the computer system.

Figure 5:
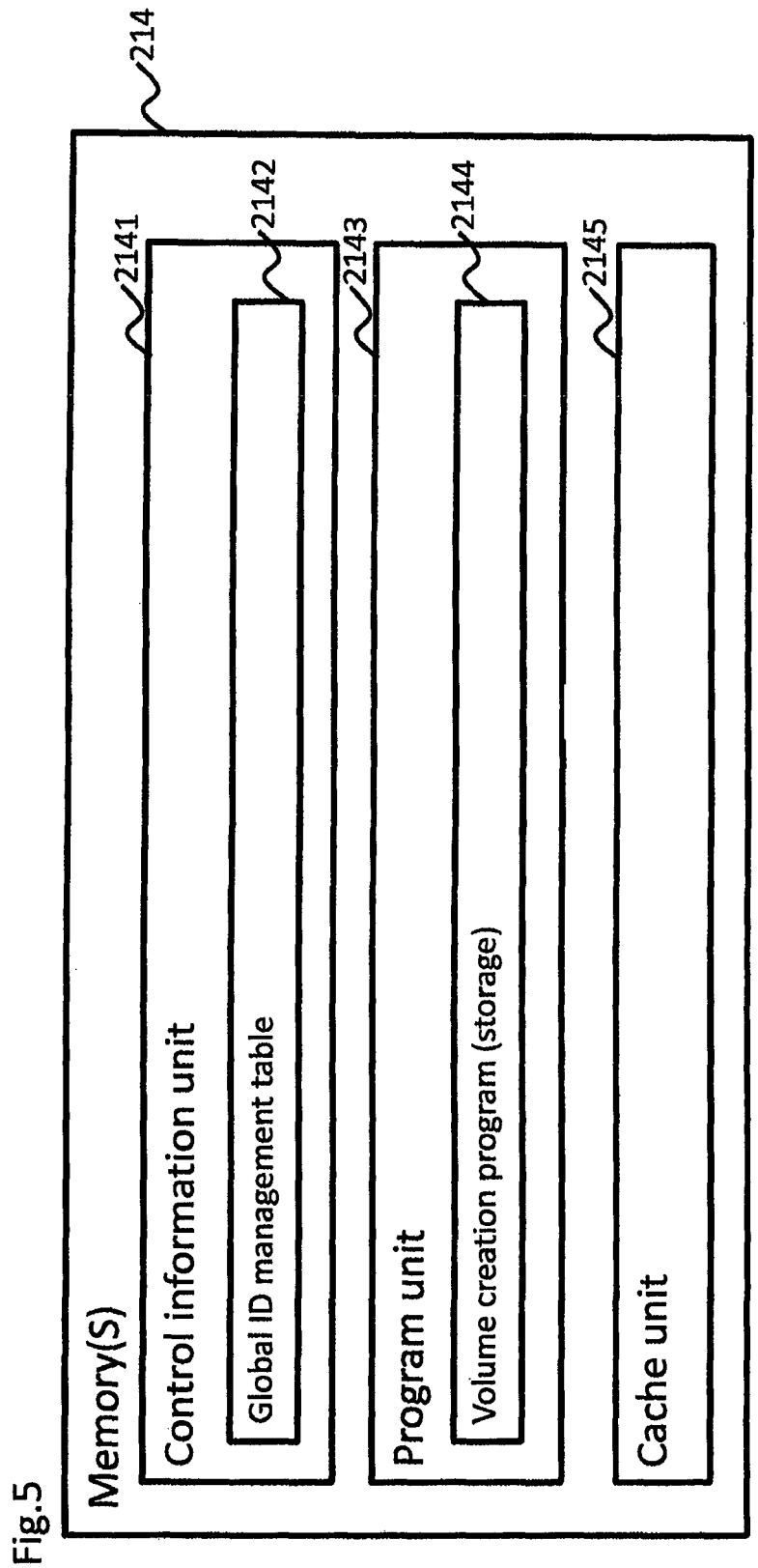
FIG. 5 is a detailed block diagram showing an example of the memory (S) in the physical storage system in accordance with the first embodiment.

FIG. 5 is a detailed block diagram showing an example of the memory (S) 214 in the physical storage system 210 in accordance with the first embodiment. A control information unit 2141 contains a global ID management table 2142. This table stores the information used by the processing explained later. Details of this table are shown in FIG. 6. A program unit 2143 contains a volume creation program (storage) 2144 to create a new volume. A cache unit 2145 is provided for caching.

FIG. 6 is an example of a global ID management table 2142 managed in the physical storage system 210. Global volume ID is a volume identification to identify the volume uniquely in the virtualized storage system 200. PDKC ID is an identification to identify the physical storage system 210 uniquely in the computer system. Local volume ID is a volume identification to identify the volume uniquely in a physical storage system 210. Volume size is the size of the volume which is specified by the global volume ID.

Figure 7:
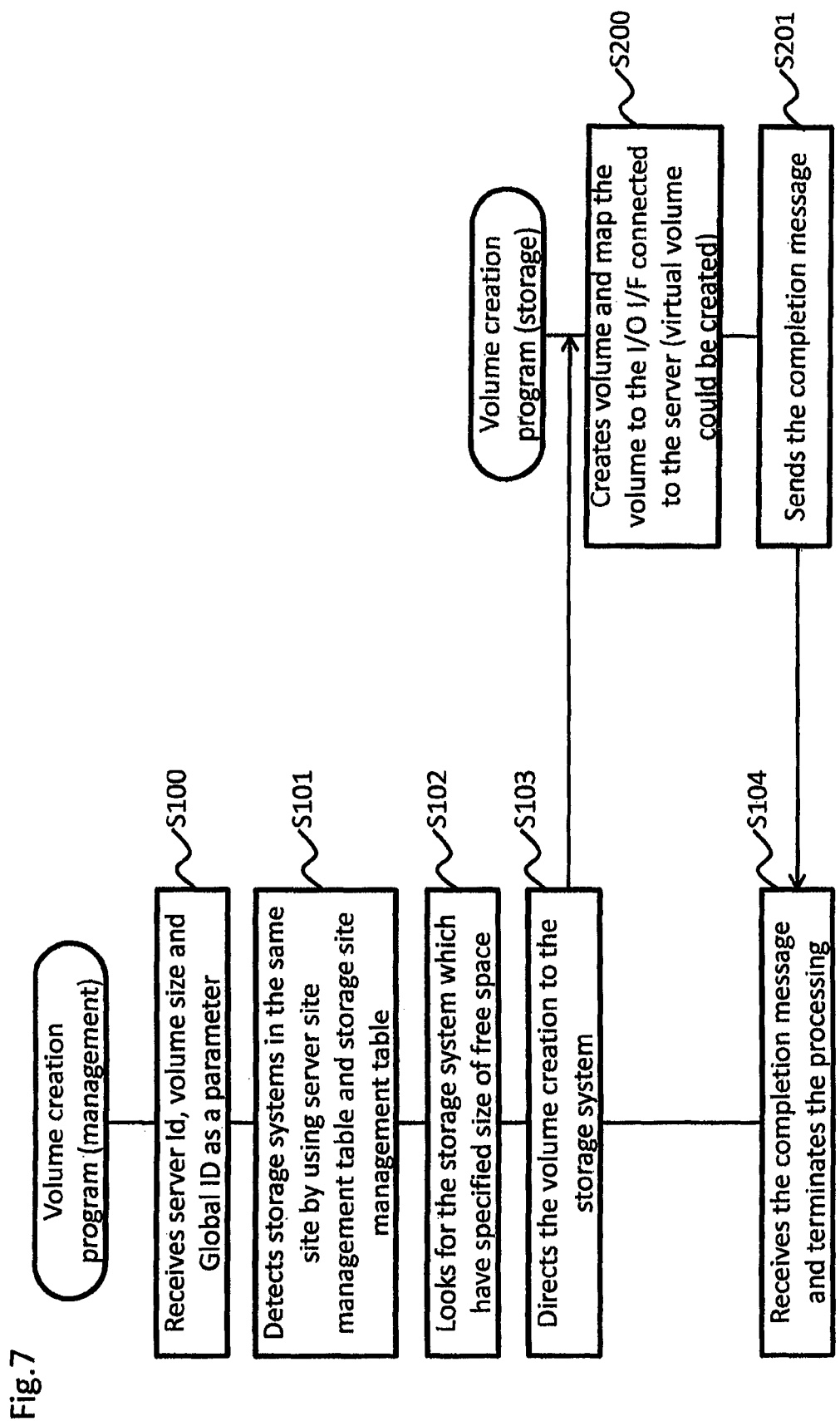
FIG. 7 is an example of a flow diagram illustrating a volume creation processing flow.

FIG. 7 is an example of a flow diagram illustrating a volume creation processing flow. This processing is achieved by the volume creation program (management) 306 and the volume creation program (storage) 2144. In step S100, the volume creation program (management) 306 receives a volume creation request from an operator via an input/output part of management server 300. At that time, the volume creation program receives the server ID, global volume ID, and volume size as parameters. In step S101, the volume creation program (management) 306 detects PDKCs in the same site by using the server site management table 303 and storage site management table 304. In step S102, the volume creation program (management) 306 looks for one or more storage systems which have the specified size of free space. In step S103, the volume creation program (management) 306 directs the volume creation to the PDKC. If two or more PDKCs are found in step S102, the PDKC having the largest free space may be chosen or the PDKC with the lowest load may be chosen. Alternatively, the program may consider step S102 finished as soon as the first PDKC which fulfills the conditions is found and progress to step S103.

The volume creation program (storage) 2144 which received the direction creates a volume and maps the volume to the I/O I/F connected to the server specified by the server ID (step S200). This created volume could be a virtual volume. Virtual volume technology allocates a physical storage area when data is written in from the server 100. This technology is implemented in many storage products. After volume creation, the volume creation program (storage) 2144 sends a completion message to the caller (step S201). In step S104, the volume creation program (management) 306 receives the completion message from the PDKC and terminates the processing.

The optimal physical storage area is determined when the server only specifies the global volume ID by the processing mentioned above. Also when virtualized storage system includes the PDKCs in different data centers, the PDKC which causes the degradation of I/O latency is not chosen. Thus, the design cost and operation cost to make the configuration are reduced.

Second Embodiment

The second embodiment is directed to a method of choosing automatically resources for remote copy from the physical storage systems which constitute the virtualized storage system. The method also performs automatic configuration for remote copy such as, remote copy path configuration and creation of transfer data storing area. Remote copy functionalities are described by using FIG. 8 and FIG. 9. The remote copy is classified into two types: synchronous remote copy and asynchronous remote copy.

Figure 8:
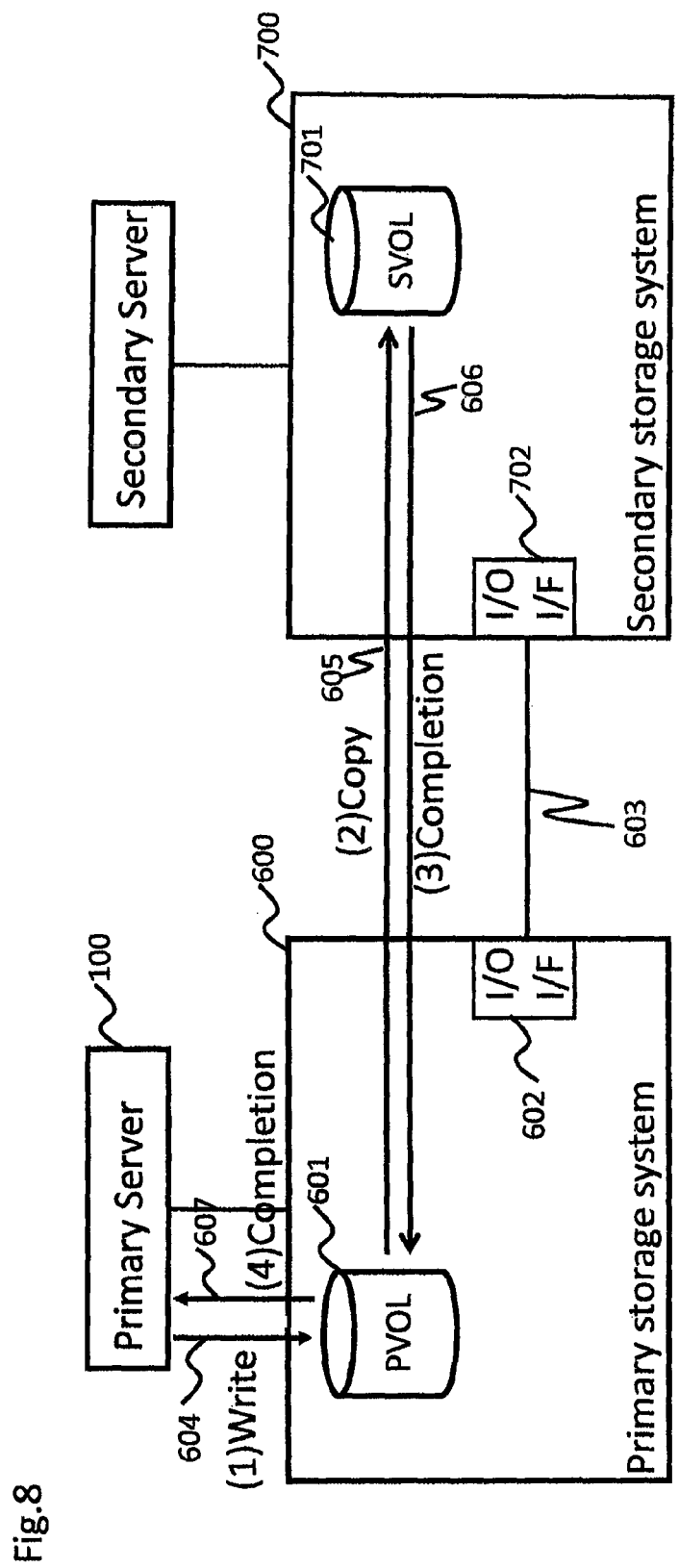
FIG. 8 shows an example of a remote copy configuration for synchronous remote copy processing.

FIG. 8 shows an example of a remote copy configuration for synchronous remote copy processing. A primary storage system 600 is a source storage system of remote copy and includes a primary volume (PVOL) 601 which stores the data used by the server. A secondary storage system 700 is a destination storage system of remote copy and includes a secondary volume (SVOL) 701 which stores the copy data of PVOL 601. The relationship between PVOL 601 and SVOL 701 is called a remote copy pair. The primary storage system 600 and the secondary storage system 700 have one or more I/O I/F 602, 702, respectively, for data transferring. For synchronous remote copy processing, the primary storage system 600 receives a write request from the server 100. Then, the primary storage system 600 writes the write data to the PVOL 601 and transfers the write data to the secondary storage system 700. The primary storage system 600 does not send a completion message to the server until a completion message from the secondary storage system 700 is received. The secondary storage system 700 which received the copy request writes the transferred data to the SVOL 701 and sends the completion message to the primary storage system 600. Finally, the primary storage system 600 sends the completion message to the server 100. In such synchronous remote copy, a high identicalness of data is achieved between the PVOL 601 and SVOL 701. Accordingly, even if a failure occurs to the primary storage system 600, consequential data loss can be minimized. There is a drawback, however, of lengthening a write response time with an increase of the distance between the primary and secondary storage systems.

Figure 9:
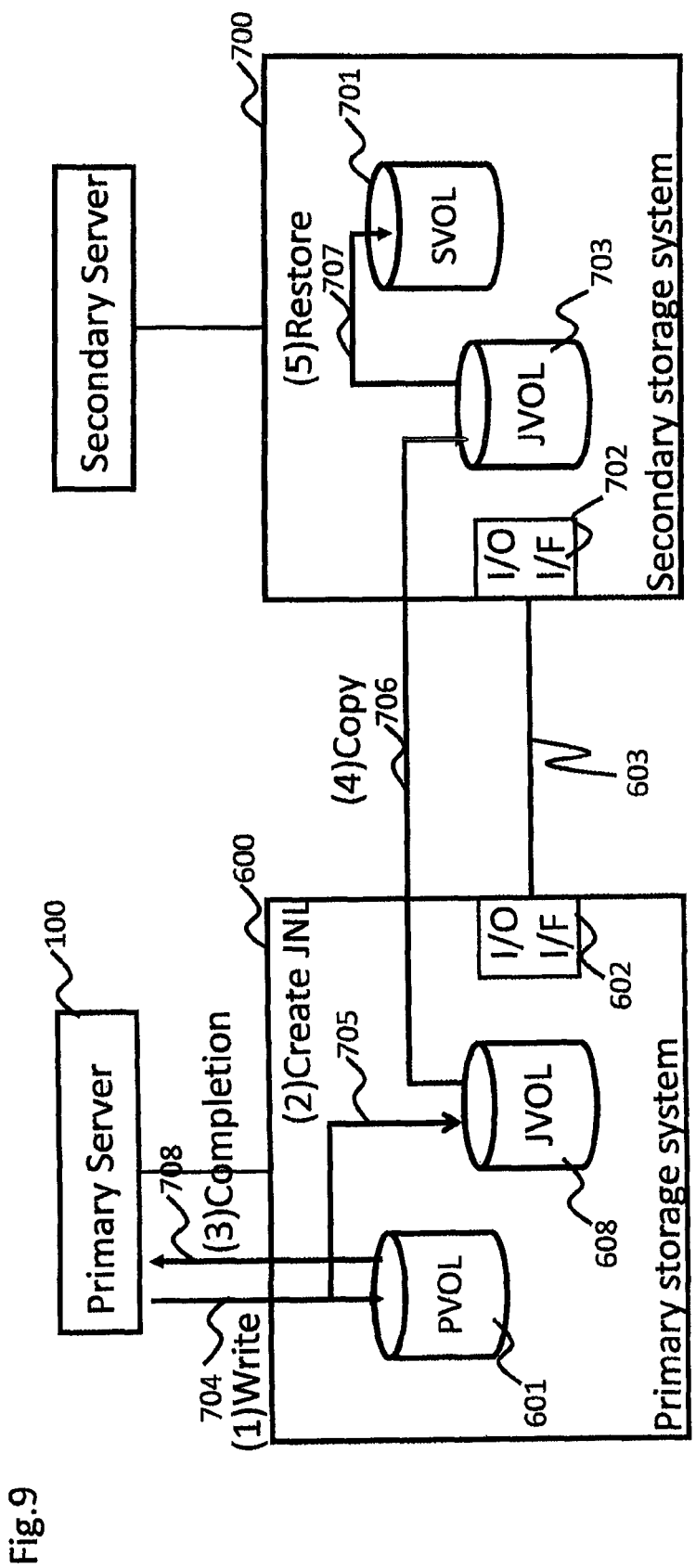
FIG. 9 shows an example of a remote copy configuration for asynchronous remote copy processing.

FIG. 9 shows an example of a remote copy configuration for asynchronous remote copy processing. The primary storage system 600 receives the write request from the server 100. Then, the primary storage system 600 stores the write data in the PVOL 601 and in the JVOL 608 as a journal (JNL). JNL is a transfer data and the JVOL 608 is a storage area to store the JNLs temporarily. The JVOL does not necessarily have to be a volume. The JNLs could be stored in the cache unit 2145. After that, the primary storage system 600 sends a completion message to the server. The JNLs are transferred asynchronously to the JVOL 703 in the secondary storage system 700. Finally, the JNLs stored in the JVOL 703 are copied to the SVOL 701. As such, the write response time is shorter compared with the synchronous remote copy. There also is a drawback, however, of easier and a larger amount of data loss if a failure occurs to the primary storage system 600 as compared with the synchronous remote copy. In the existing remote copy system, an operation must configure the secondary storage system, SVOL, JVOL, I/O I/F for remote copy, the server (secondary), remote copy pair, and so on. These operations are very complicated.

Figure 10:
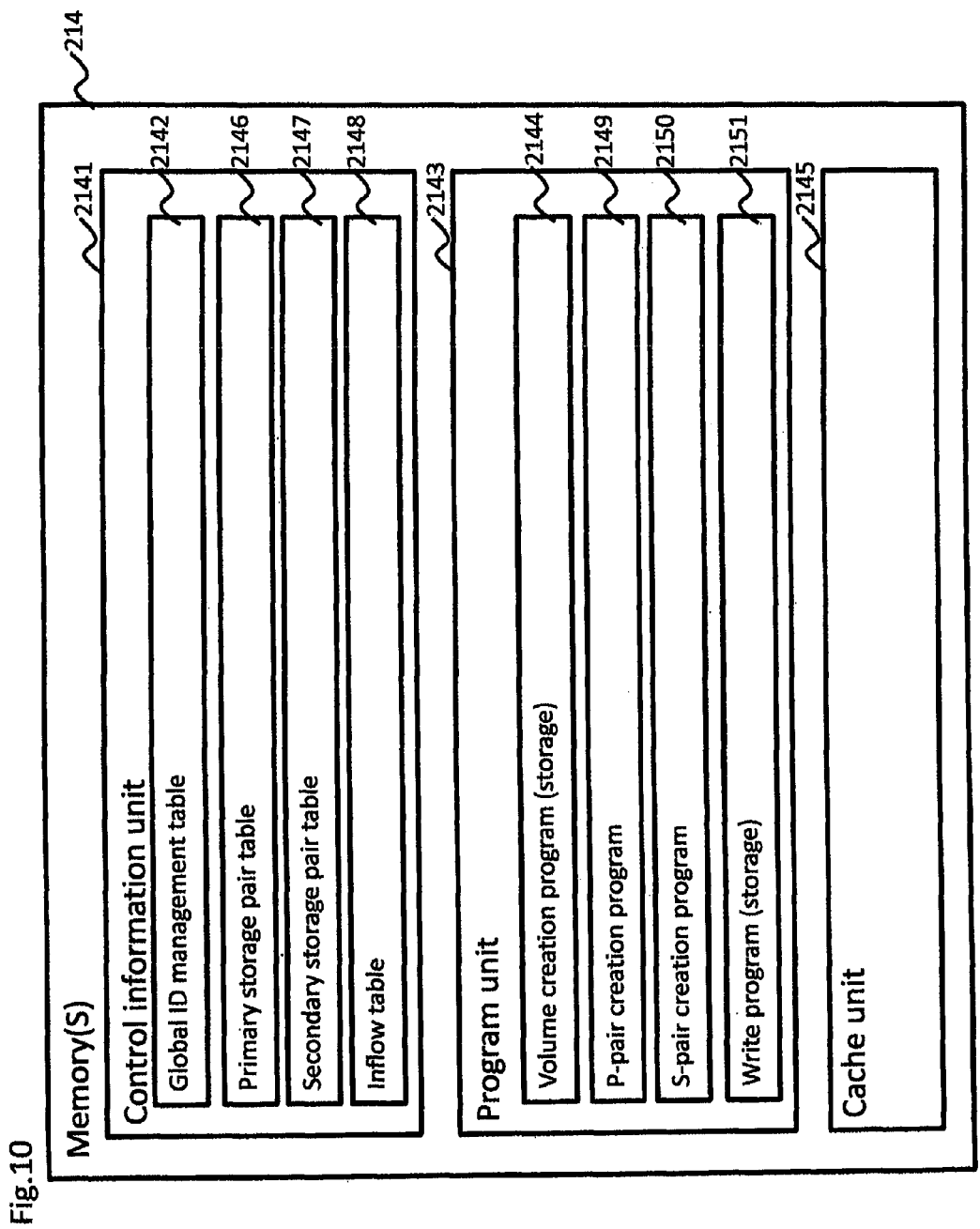
FIG. 10 is a detailed block diagram showing an example of the memory (S) in the physical storage system in accordance with the second embodiment.
Figure 17:
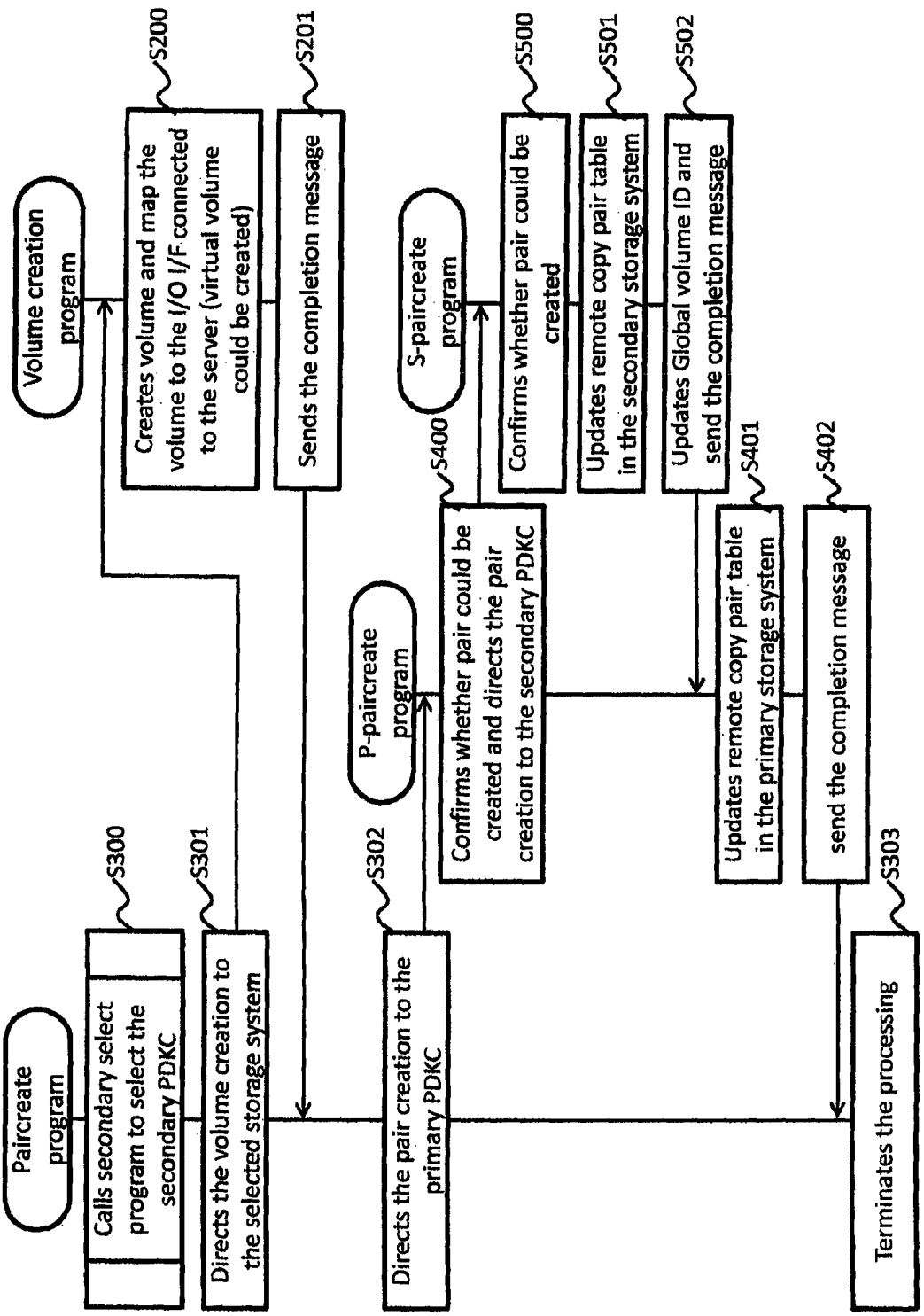
FIG. 17 is an example of a flow diagram illustrating a pair creation processing flow.

FIG. 10 is a detailed block diagram showing an example of the memory (S) 214 in the physical storage system 210 in accordance with the second embodiment. Primary storage pair table 2146, secondary storage pair table 2147, p-pair creation program 2149, s-pair creation program 2150, write program (storage) 2151, and inflow table 2148 are added as compared to the first embodiment shown in FIG. 5. Primary storage pair table 2146 and secondary storage pair table 2147 are tables to manage the relationship between PVOL 601 and SVOL 701. Details of these tables are illustrated in FIG. 12 and FIG. 13. The p-pair creation program 2149 and s-pair creation program 2150 are programs to create remote copy pair in primary and secondary storage systems. Processing flows of these programs are illustrated in FIG. 17. Write program (storage) 2151 is a program to store the write data to the object volume. In this embodiment, two cases of SVOL 701 write which is received after PVOL failure are described in FIG. 22 and FIG. 24. Inflow table 2148 is a table to manage the amount of write data written in PVOL 601. This information is provided to take the required bandwidth between primary and secondary storage systems into consideration.

Figure 11:
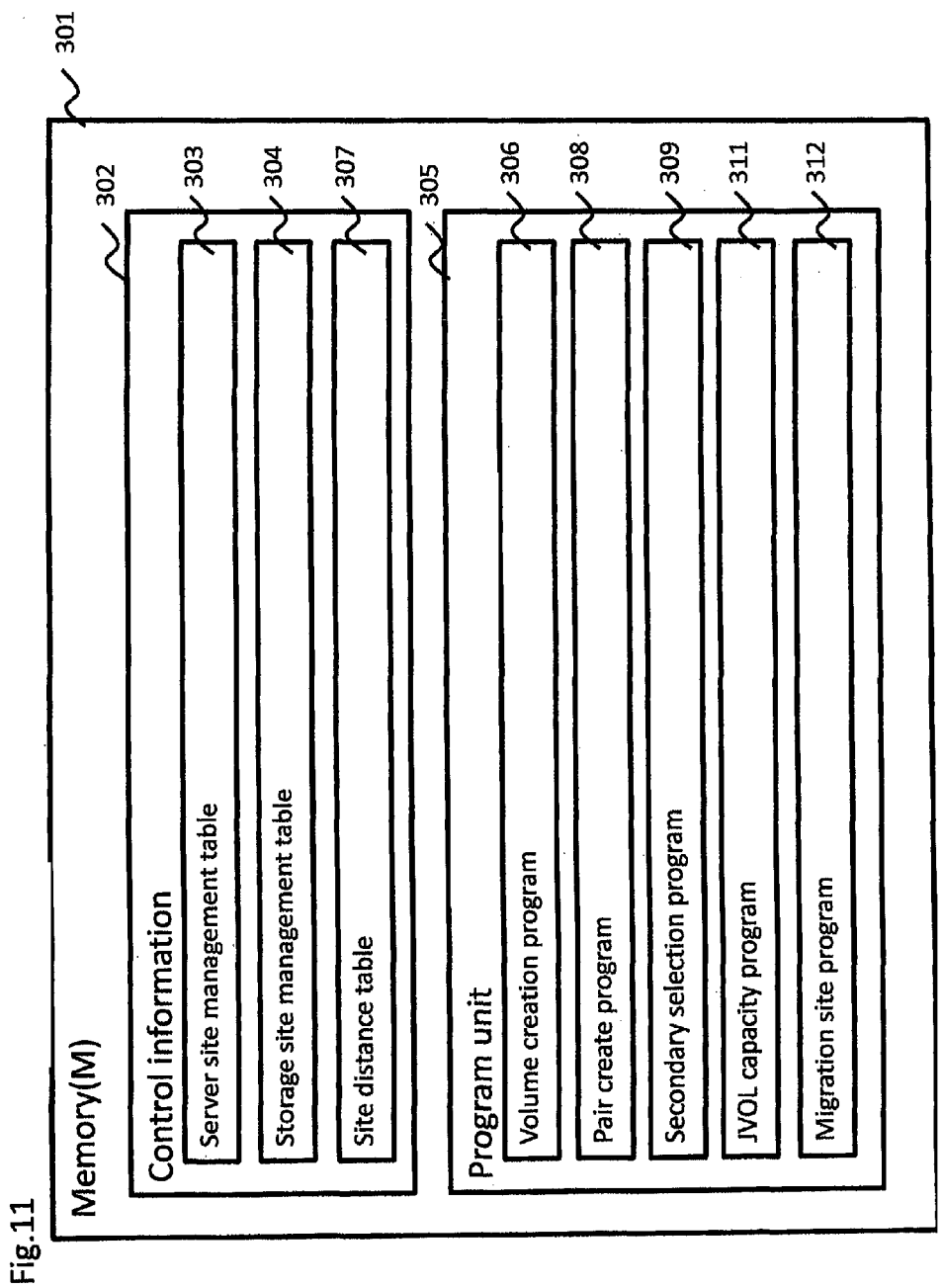
FIG. 11 is a detailed block diagram showing the memory (M) in the management server in accordance with the second embodiment.
Figure 18:
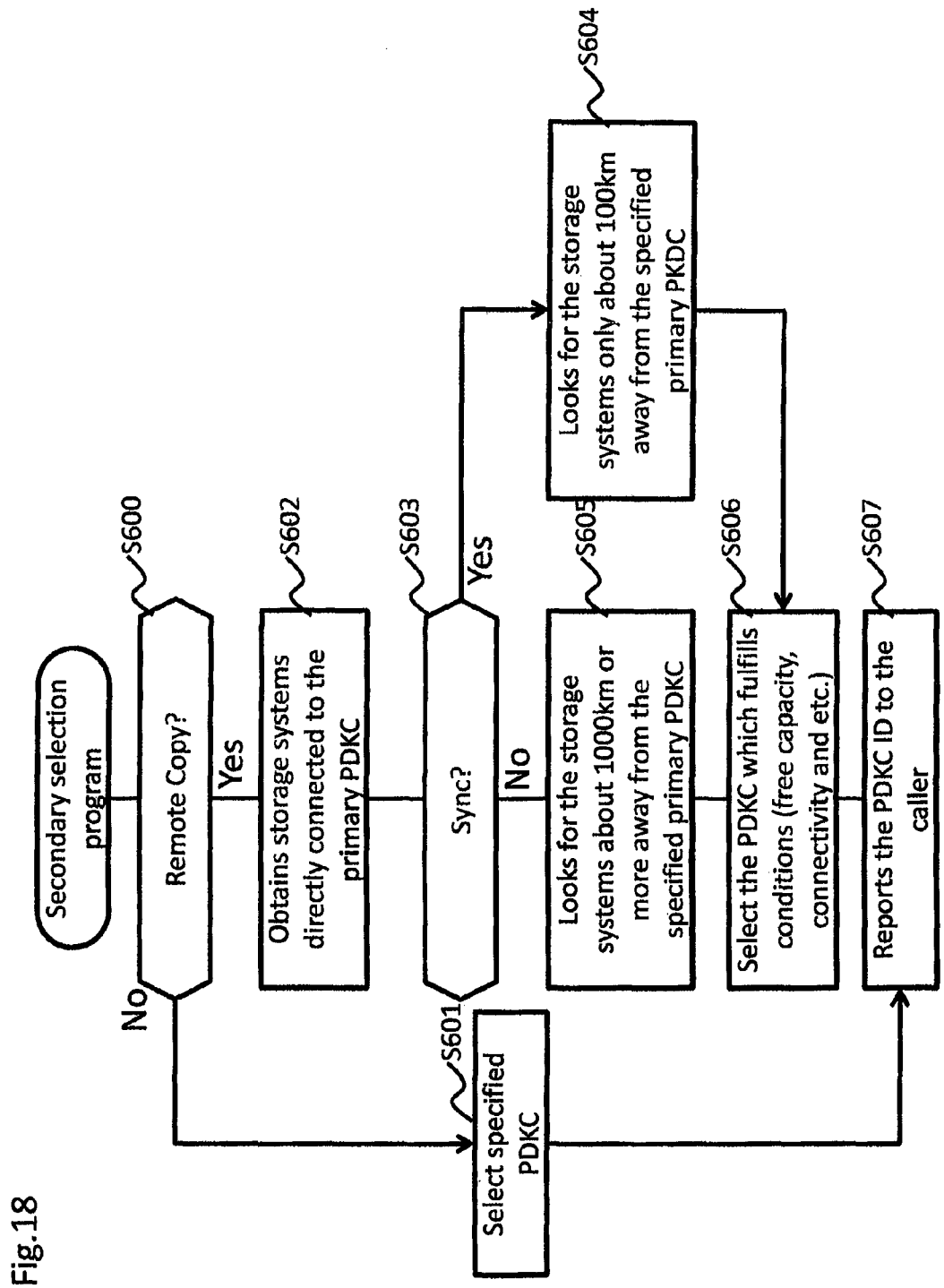
FIG. 18 is an example of a flow diagram illustrating the process flow of the secondary selection program called from the pair create program in FIG. 17.
Figure 19:
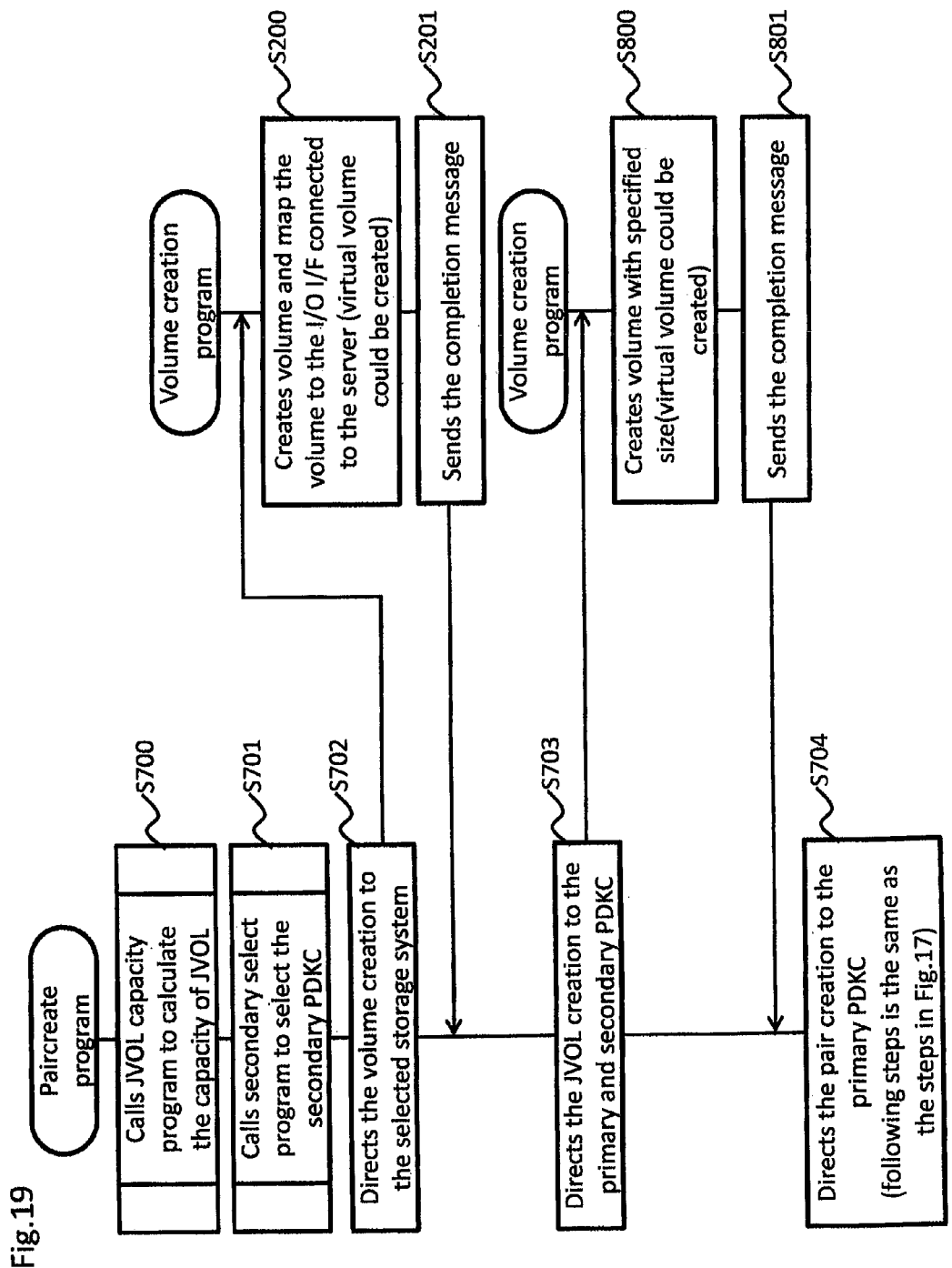
FIG. 19 is another example of a flow diagram illustrating the pair creation processing flow for asynchronous remote copy.
Figure 20:
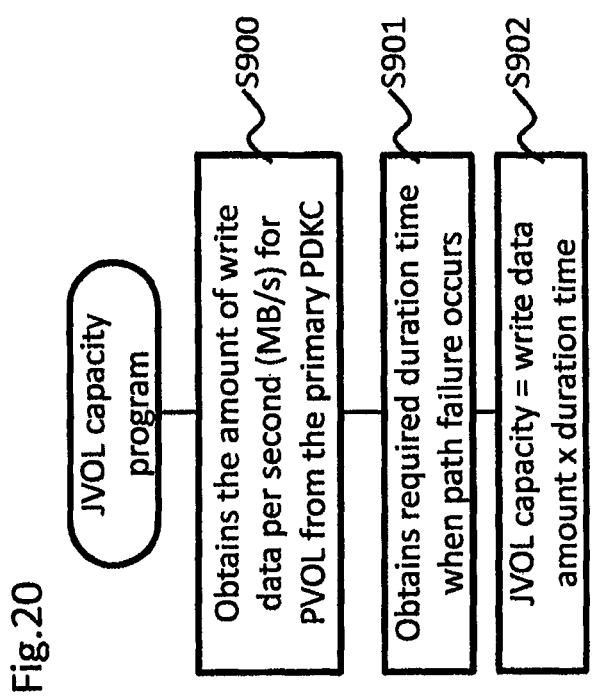
FIG. 20 is an example of a flow diagram illustrating the process flow of the JVOL capacity program to calculate the needed capacity of the JVOL.
Figure 24:
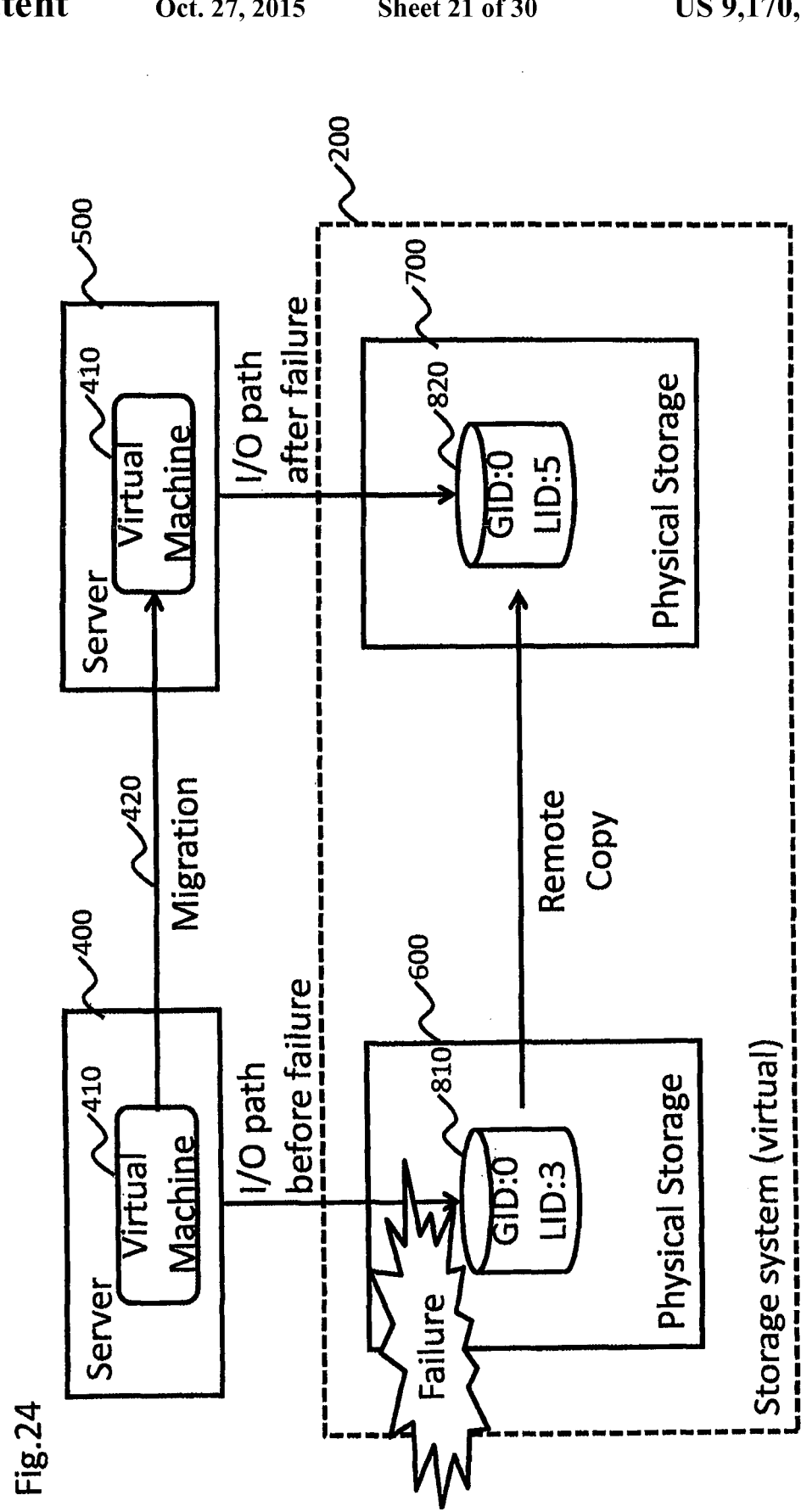
FIG. 24 is a conceptual diagram illustrating server change after the PVOL failure and subsequent change in processing involving the SVOL.
Figure 25:
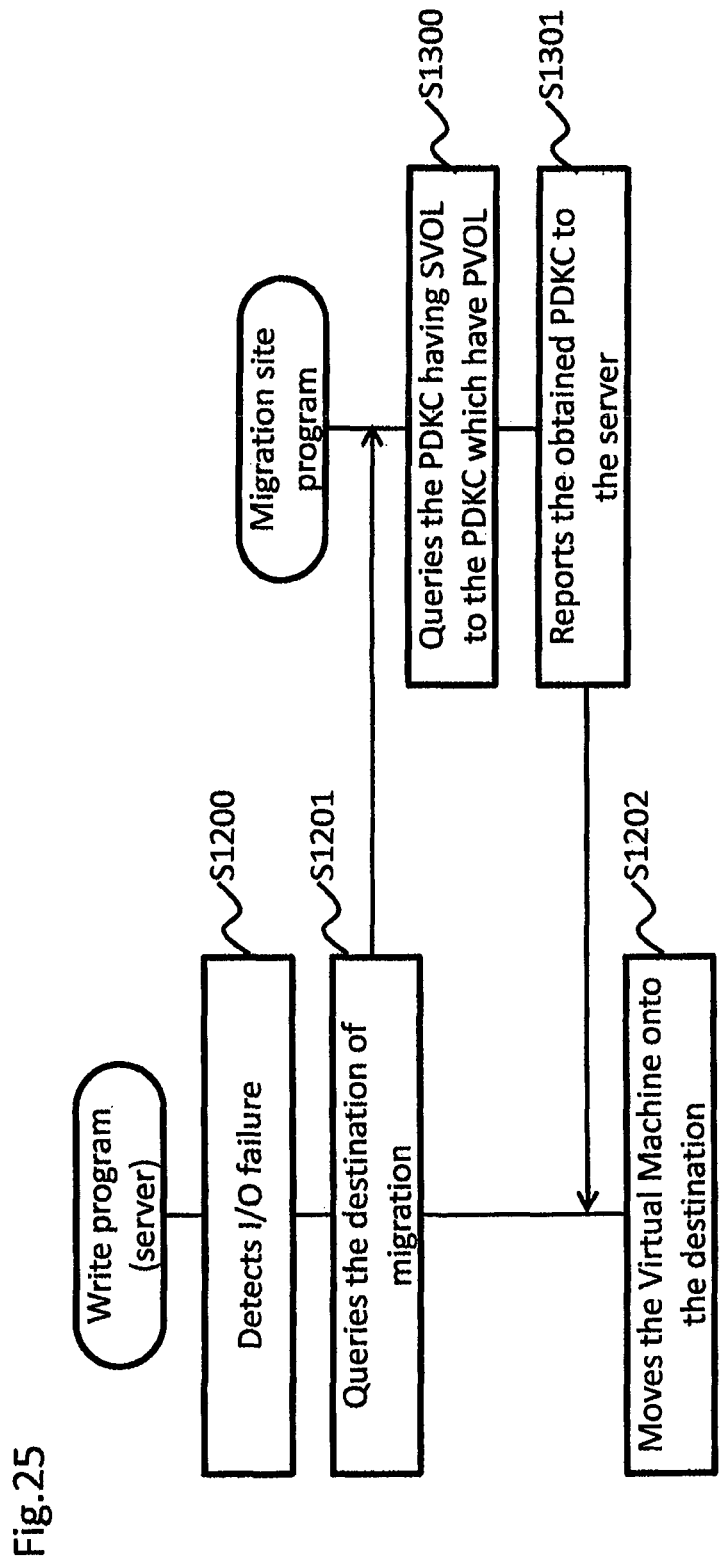
FIG. 25 is an example of a flow diagram illustrating a migration processing of the virtual machine after the PVOL failure and processing to determine the destination.

FIG. 11 is a detailed block diagram showing the memory (M) 301 in the management server 300 in accordance with the second embodiment. Site distance table 307, pair creation program 308, secondary selection program 309, JVOL capacity program 311, and migration site program 312 are added as compared to the first embodiment shown in FIG. 2. Site distance table 307 is a table to manage the distance between data centers. Details of the table are shown in FIG. 15. Pair creation program 308 and secondary selection program 309 are programs to choose copy destination and direct the creation of remote copy pair to the storage system. Processing flows of these programs are illustrated in FIGS. 17-19. JVOL capacity program 311 is a program to estimate required JVOL capacity. Processing flow of the program is illustrated in FIG. 20. Migration site program 312 is a program to determine the destination of migration for the server processing. Concept and processing of the program are illustrated in FIG. 24 and FIG. 25.

FIG. 12 is an example of a primary storage pair table 2146 in the memory (S) 214 of the physical storage system 210. FIG. 13 is an example of a secondary storage pair table 2147 in the memory (S) 214 of the physical storage system 210. The primary storage pair table 2146 is used when the physical storage system 210 is configured as a primary of remote copy. The secondary storage pair table 2147 is used when the physical storage system 210 is configured as a secondary of remote copy. Primary volume ID is an ID of the volume which is a copy source volume. Secondary PDKC ID is an ID of the secondary physical PDKC 700 that has the SVOL 701. Secondary volume ID is a local volume ID which is the copy destination volume of the PVOL 601. Primary PDKC ID is an ID of the primary physical PDKC 600 that has the PVOL 601.

FIG. 14 is an example of an inflow table 2148 managed in the physical storage system 210. This table manages the inflow of write data to each volume. Local volume ID stores ID of each volume and inflow stores the amount of write data per second for each volume.

FIG. 15 is an example of a site distance table 307 managed in the management server 300. The meaning of site ID the same as that of site ID in FIG. 3. Distance stores the distance between data centers specified by site IDs.

Automatic remote copy configuration processing is described by using FIG. 16 to FIG. 21.

Figure 16:
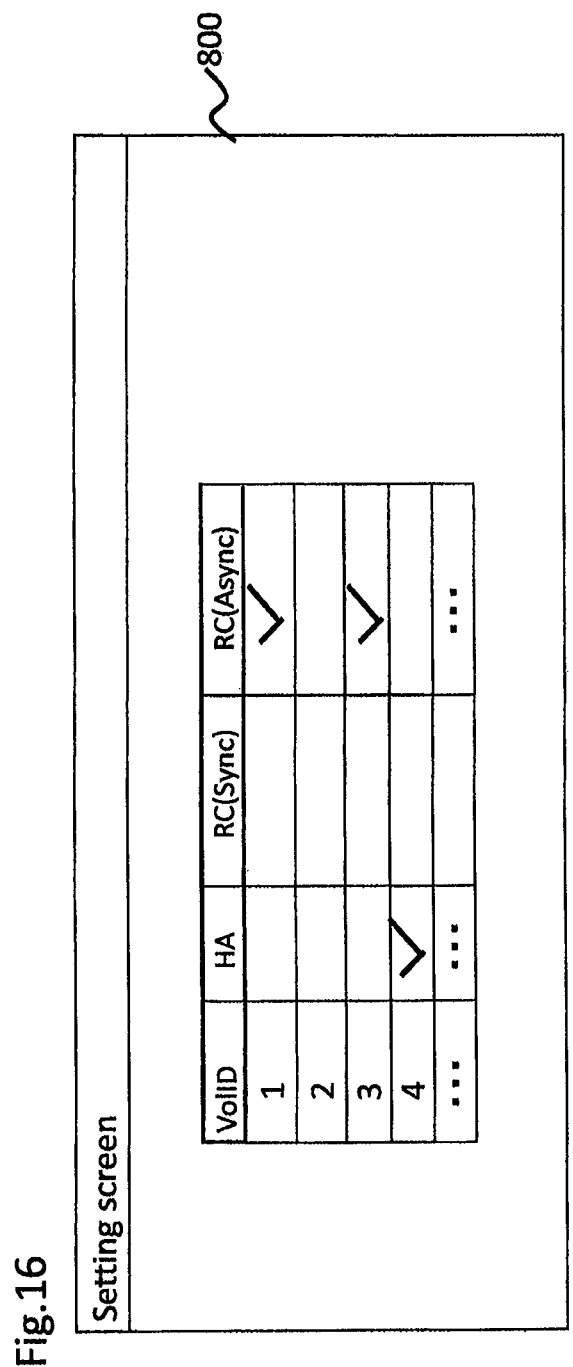
FIG. 16 is an example of a setting screen for data replication.

FIG. 16 is an example of a setting screen 800 for data replication. HA (High Availability) means local replication. RC (Sync) means synchronous type of remote copy. RC (async) means asynchronous type of remote copy. The setting screen 800 has check boxes. Functions, such as remote copy, are applied by checking the box. In the example shown, asynchronous remote copy is applied to volume which has volume ID 1.

FIG. 17 is an example of a flow diagram illustrating a pair creation processing flow. In step S300, the pair create program 308 calls the secondary selection program 309 to select the secondary PDKC. The process flow of the secondary selection program 309 is shown in FIG. 18. In step S301, the pair create program 308, having received secondary information from the secondary selection program 309, directs the volume creation to the selected storage system. The processing of the volume creation program (storage) 2144 in the selected storage system is the same as steps S200 and S201 of FIG. 7. In step S302, the pair create program 308 directs the pair creation to the primary PDKC and waits for a completion message. At that time, the global volume ID specified by the operator and local volume ID chosen in step S301 and the ID of secondary PDKC 700 chosen in step S300 are sent as parameters.

The primary PDKC 600 which receives the pair creation request executes the p-pair create program 2149. The p-pair create program 2149 confirms whether a pair could be created (step S400). For example, it involves determining whether the primary storage pair table 2146 has a free entry, whether the primary PDKC 600 is connected to the secondary PDKC 700 and so on. After the confirmation, the p-pair create program 2149 directs the pair creation to the secondary PDKC chosen in step S300. The global volume ID, local volume IDs of PVOL and SVOL and ID of primary PDKC are sent as parameters.

The secondary PDKC 700 which receives the pair creation request executes s-pair create program 2150. The s-pair create program 2150 confirms whether the pair could be created and updates the secondary storage pair table 2147 (steps S500 and S501). In step S502, the s-pair create program 2150 updates the Global ID management table 2142 and sends the completion message to the primary PDKC 600. The received global volume ID is stored in the global volume field and the received local volume ID is stored in the local volume ID field. Its own ID is stored in the PDKC ID field. The size of volume which is specified by the local ID is stored in the volume size field.

In step S401, the p-pair create program 2149 updates the primary storage pair table 2146 in the primary PDKC 600 after receiving the completion message from the secondary PDKC 700. In step S402, the p-pair create program 2149 sends a completion message to the caller (pair create program 308). In step S303, the pair create program 308 terminates the processing.

FIG. 18 is an example of a flow diagram illustrating the process flow of the secondary selection program 309 called from the pair create program 308 in FIG. 17. This program is used to choose the optimal copy destination storage. In step S600, the secondary selection program 309 confirms whether the request is a remote copy request. If the request is not a remote copy request, the program proceeds to step S601 and chooses its own PDKC as a copy destination PDKC (step S601) and then reports the PDKC ID to the caller in step S607. This is because the request is for local replication. If the request is a remote copy request, the secondary selection program 309 identifies storage systems directly connected to the primary PDKC which has the PVOL (step S602). Then, the secondary selection program 309 confirms whether the request is a synchronous remote copy request (step S603). If the request is a synchronous remote copy request, the program proceeds to step S604 and looks for storage systems only about 100 km away from the specified primary PDKC (step S604). The meaning of 100 km is the distance which can provide permissible I/O response time in general for synchronous remote copy. Some other distance which can provide permissible I/O response time could be applied instead. If the request is not a synchronous remote copy request, the secondary selection program 309 looks for storage systems about 1000 km or more away from the specified primary PDKC (step 605). The meaning of 1000 km is the distance which can avoid an aftermath of primary data center disaster. Some other distance which can avoid an aftermath of disaster could be applied instead. After step S604 or S605, the secondary selection program 309 selects the PDKC which fulfills the conditions (e.g., free capacity for SVOL, connectivity and so on) in step S606. Finally, the secondary selection program 309 reports the decided PDKC ID to the caller (step S607).

The case of asynchronous remote copy configuration is described by using FIG. 19 and FIG. 20.

FIG. 19 is another example of a flow diagram illustrating the pair creation processing flow for asynchronous remote copy. In step S700, the pair create program 308 calls the JVOL capacity program 311 to calculate the needed capacity of the JVOL 608, 703. The pair create program 308 calls the secondary selection program 309 and directs the volume creation (steps S701 and S702). Steps S701 and S702 are the same as step S300 and S301 in FIG. 17. The processing of volume creation program (storage) 2144 is the same as steps S200 and S201 of FIG. 7. Then, the pair create program 308 directs the JVOL creation to the primary and secondary PDKCs (step S703). The JVOL size calculated in step S701 is sent as a parameter. Each PDKC which receives the JVOL creation request creates a volume with the specified size, and this created volume could be a virtual volume (step S800). The PDKCs each send a completion message to the caller (step S801). Finally, the pair create program 308 directs the pair creation to the primary PDKC in step S704. The subsequent steps following step S704 are the same as the subsequent steps following step S302 in FIG. 17.

FIG. 20 is an example of a flow diagram illustrating the process flow of the JVOL capacity program 311 to calculate the needed capacity of the JVOL 608, 703. A capacity of the JVOL 608, 703 will be described in the following. In the case in which a path failure occurs between the primary PDKC 600 and the secondary PDKC 700, for instance, a JNL starts to remain for the JVOL 608. In the case in which the path failure is resolved after that, JNLs stored in the JVOL 608 are transmitted to the JVOL 703. Consequently, in the case in which the JVOL 608 is provided with a capacity sufficient to store JNLs that have been generated, a remote copy can be continued without suspension and resync of a remote copy pair. A capacity of the JVOL 608 is designed in accordance with a required time which the user wants to withstand the path failure. Thus, the JVOL capacity could be calculated by using the required time and the amount of the data written from the server 100. The JVOL capacity program 311 obtains the amount of write data per second for the PVOL 601 from the primary PDKC 600 (step S900). Then, the JVOL capacity program 311 obtains the required duration time when path failure occurs (step S901). The required duration time is inputted to the management server 300 by using the input/output part. Finally, the JVOL capacity program 311 calculates the JVOL capacity (step S902). The JVOL capacity is calculated by the amount of the write data times the duration time.

Figure 21:
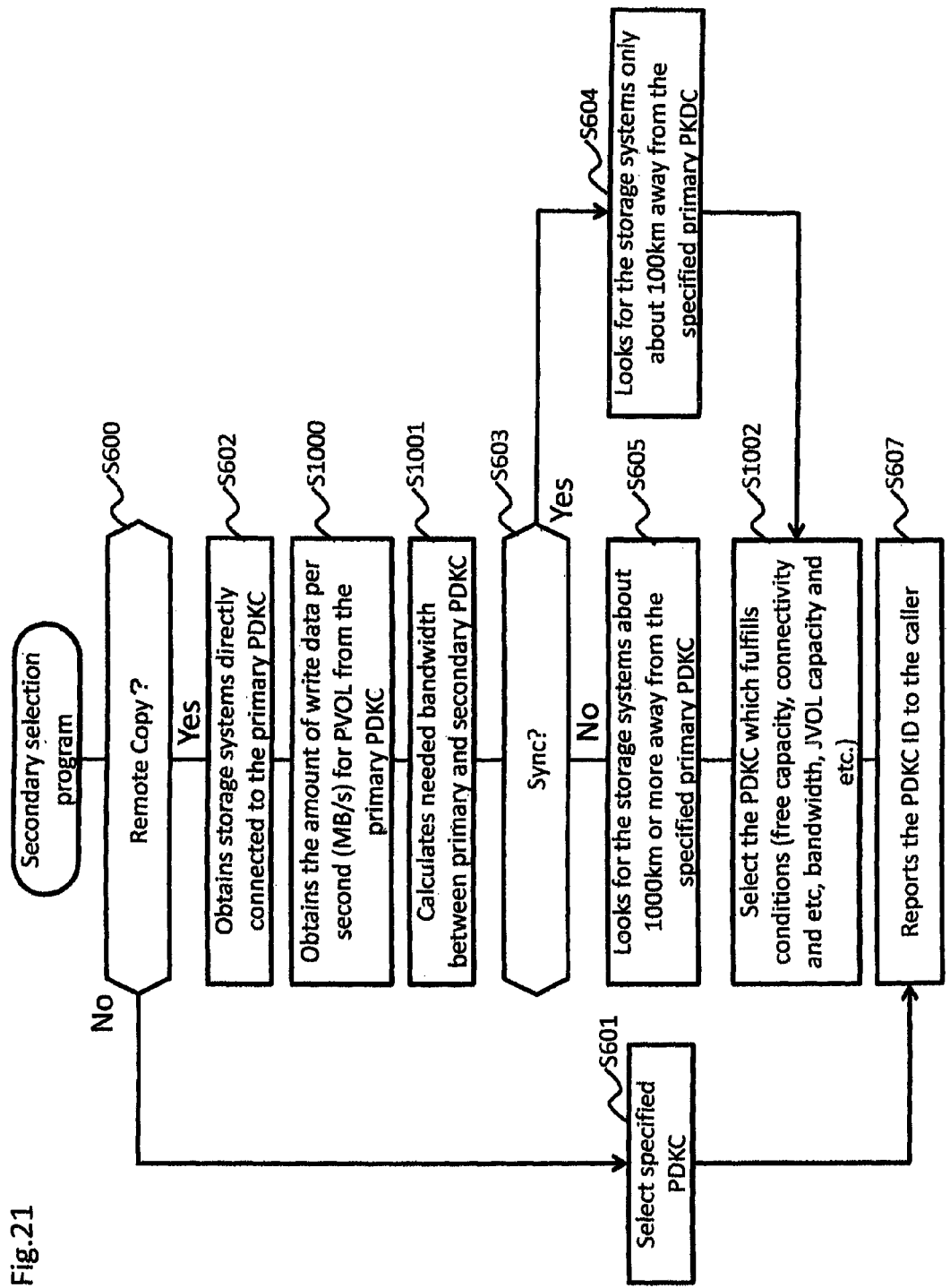
FIG. 21 is another example of a flow diagram illustrating the process flow of the secondary selection program.

FIG. 21 is another example of a flow diagram illustrating the process flow of the secondary selection program 309. This example considers the bandwidth between the primary PDKC and secondary PDKC. Only steps that are different from FIG. 18 are explained. Additional steps S1000 and S1001 are executed after step S602, and step S1002 instead of step S606 is executed after step S605 or step S604. In step S1000, the secondary selection program 309 obtains the amount of write data per second (MB/s) for the PVOL from the primary PDKC 600. In step S1001, the secondary selection program 309 calculates the needed bandwidth between the primary and secondary PDKCs. In the secondary PDKC choosing step (S1002), the secondary selection program 309 takes the calculated bandwidth into consideration.

Figure 22:
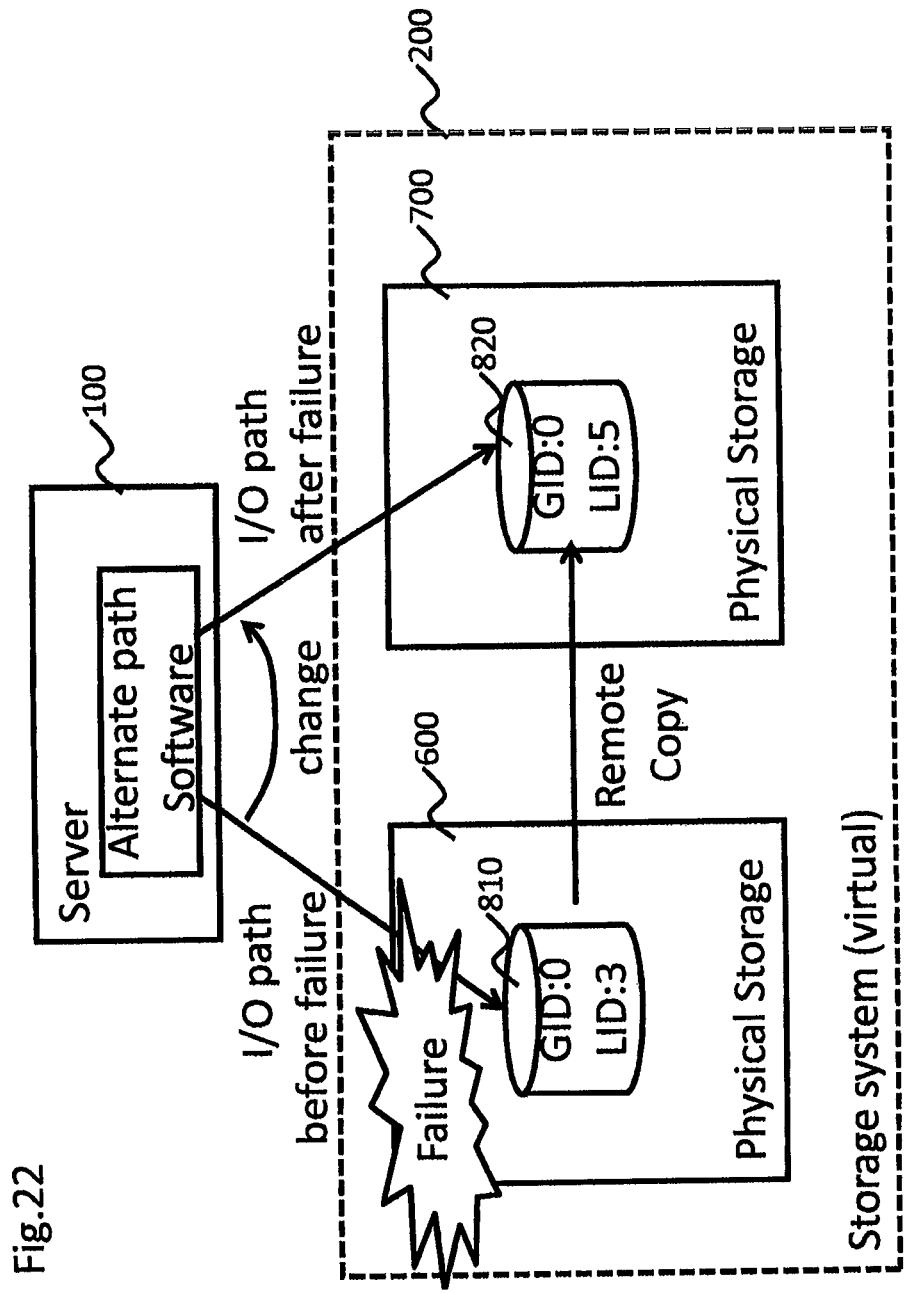
FIG. 22 is a conceptual diagram illustrating the processing after I/O failure.

FIG. 22 is a conceptual diagram illustrating the processing after I/O failure. The server 100 uses the volume whose volume ID is 0. The server 100 has alternate path software. In the example of FIG. 22, the alternate path software has two paths to the volume 0. The virtualized storage system 200 is provided to the server 100. In the storage system layer, I/O from the server 100 is issued to the physical storage system 600, and stored data in the volume 810 (of the physical storage system 600) is copied to the volume 820 (of the physical storage system 700). When primary PDKC failure occurs, the alternate path software changes the I/O path and issues the I/O again. In the storage system layer, I/O from the server 100 is issued to the physical storage system 700. The write data is stored in the volume 820 of the physical storage system 700. Since the volume ID provided to the server 100 is the same, the server 100 is not conscious of the change of physical storage system. In general, the SVOL of remote copy refuses the server I/O for consistency. After PVOL failure, the status of SVOL must be changed into the status which can receive and process the server I/O. This processing is illustrated in FIG. 23.

Figure 23:
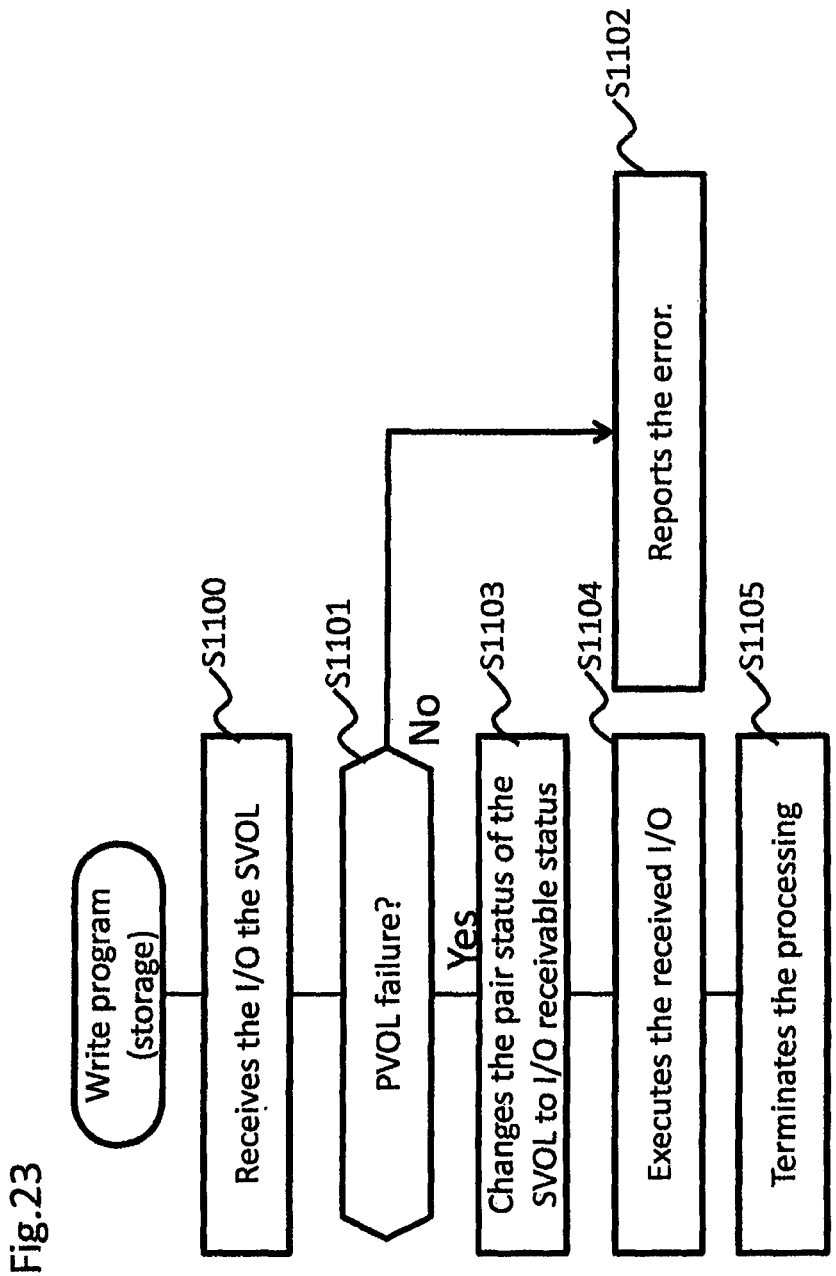
FIG. 23 is an example of a flow diagram illustrating a write processing issued to the SVOL after the PVOL failure.

FIG. 23 is an example of a flow diagram illustrating a write processing issued to the SVOL after the PVOL failure. The write program (storage) 2151 receives the I/O to the SVOL (step S1100) and confirms whether the PVOL failure has occurred (step S1101). If the PVOL failure has not occurred, the write program (storage) 2151 reports the error to the server 100 (step S1102). If the PVOL failure has occurred, the write program (storage) 2151 changes the SVOL status into the I/O receivable status (step S1103). Then, the write program (storage) executes the I/O and terminates the processing (steps S1104 and S1105).

The case where the server 100 is not changed is illustrated in FIG. 22. With the configuration of this invention, since the physical storage systems 210 installed in different data centers can constitute the virtualized storage system 200, the I/O destination physical storage system might be changed into a data center which is different from the data center in which the server is installed. As a result, I/O beyond data center is needed and performance falls. To avoid this case, the server could also be changed.

FIG. 24 is a conceptual diagram illustrating server change after the PVOL failure and subsequent change in processing involving the SVOL. Only differences from FIG. 22 are explained. The server 400 is installed as a source of migration and the server 500 is installed as a destination of migration. The server 400 is connected to the server 500. A virtual Machine 410 is created in each of the physical servers 400 and 500. Application is served by the virtual machine. The virtual machine can be migrated from one physical server to another. This migration is executed by traditional technology. After the failure of the volume 810 or PDKC 600 and I/O destination is changed to the volume 820 in the PDKC 700, the virtual machine 410 is migrated from the server 400 to the server 500 which is in the same data center as the PDKC 700. As a result, I/O beyond data center can be avoided.

FIG. 25 is an example of a flow diagram illustrating a migration processing of the virtual machine 410 after the PVOL failure and processing to determine the destination. In step S1200, the write program (server) detects I/O failure. A response time longer than a predetermined value could also be condition of the detection. The write program (server) queries the destination of the migration to the management server 300. The management server 300 which receives the query calls the migration site program 312. The migration site program 312 queries the information of the PDKC having the SVOL to the PDKC which has the PVOL (step S1300). The PDCK can confirm it using the primary storage pair table 2146. Then, the migration site program 312 reports the obtained information of the PDKC to the server (step S1301). Finally, the write program (server) moves the virtual machine 410 to the reported PDKC.

Figure 26:
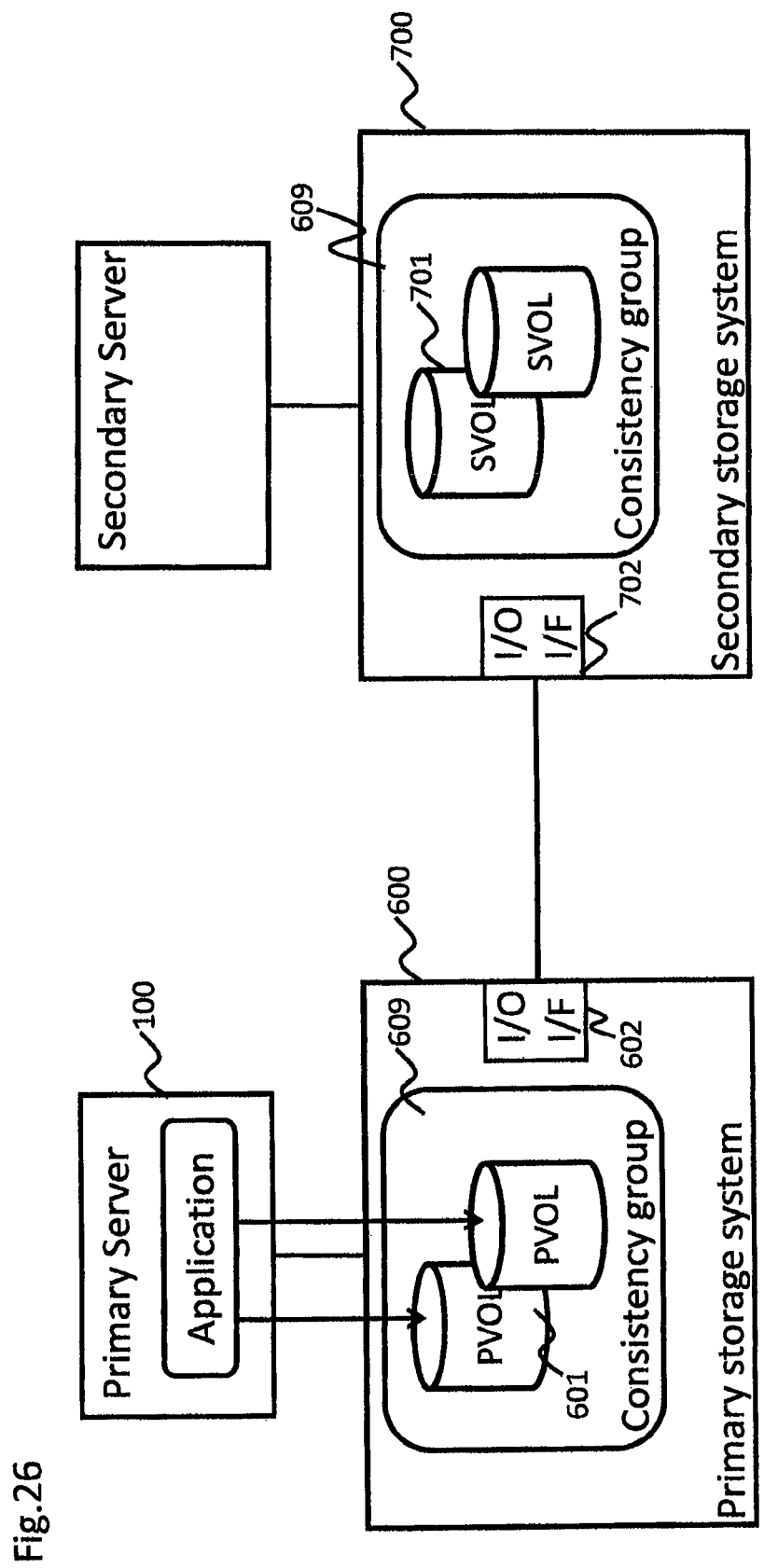
FIG. 26 is a conceptual diagram illustrating a consistency group of remote copy pairs.

In general, remote copy functionality has a consistency group 609 which consists of one or more remote copy pairs. FIG. 26 is a conceptual diagram illustrating a consistency group 609 of remote copy pairs. One or more remote copy pairs used by one application should belong to the same consistency group 609. An operator can executes the remote copy operation for the consistency group 609. As such, the operator does not need to operate each remote copy pair. Moreover, with asynchronous type of remote copy, the write order to the PVOLs 601 which belong to the same consistency group 609 is assured in the restore processing to SVOL 701. In remote copy pair creation processing, the copy destination of PVOLs which belong to the same consistency group 609 should be chosen from the same data center. Otherwise, I/O after a failure will go beyond the data center.

Figure 27:
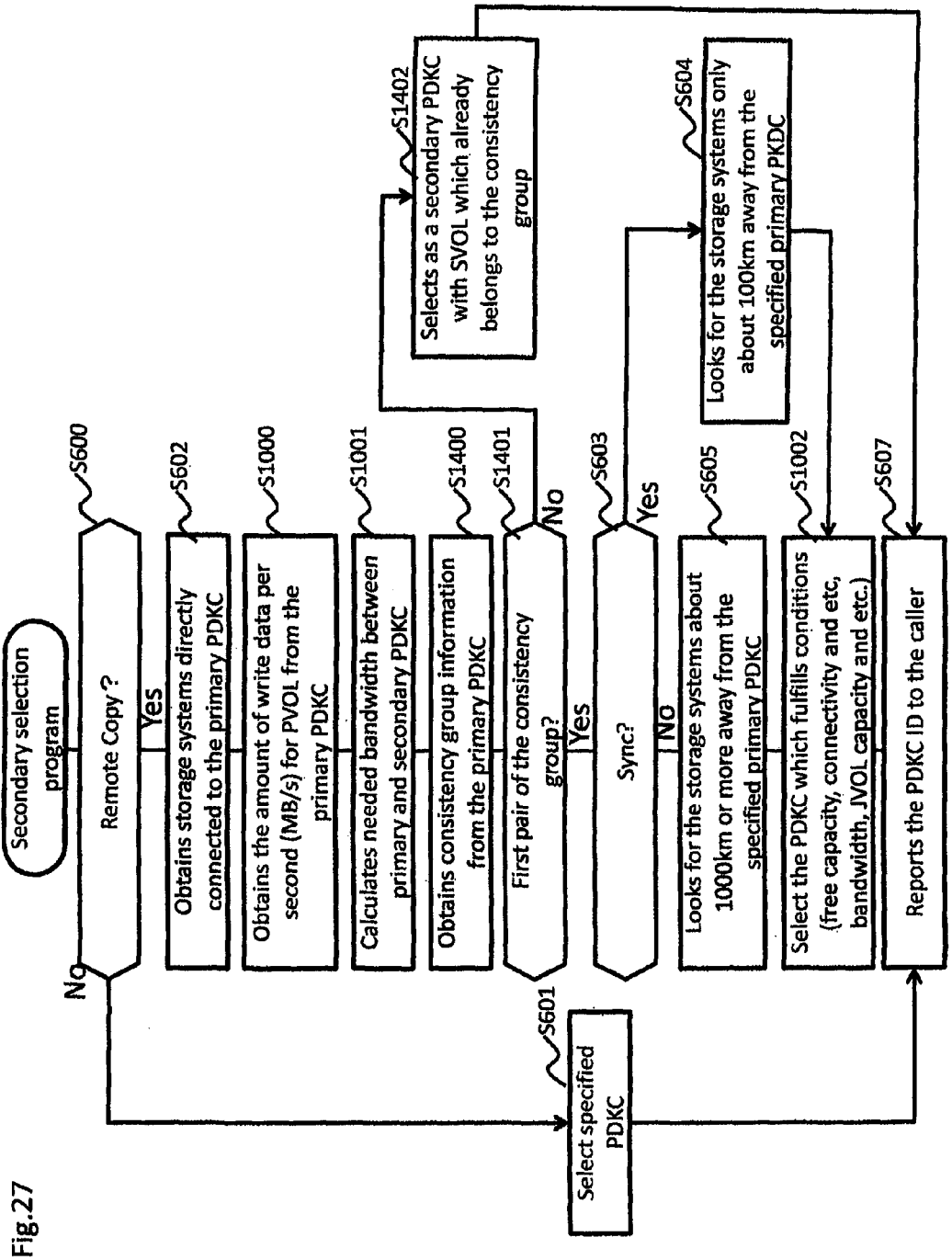
FIG. 27 is another example of a flow diagram illustrating the process flow of the secondary selection program which takes consistency group into consideration.

FIG. 27 is another example of a flow diagram illustrating the process flow of the secondary selection program 309 which takes consistency group 609 into consideration. Only differences from FIG. 21 are explained. Additional steps S1400, S1401, and S1402 are executed after step S1001. First, a consistency group ID is inputted by an operator via the setting screen 800 when remote copy is applied by using the check boxes. In step S1400, the secondary selection program 309 obtains specified consistency group information from the primary PDKC. In step S1401, the secondary selection program 309 determines whether the directed remote copy pair is the first pair of the consistency group. If yes, the secondary selection program 309 executes steps S603 to S607 and determines the secondary PDKC. Otherwise, if the directed remote copy pair is not the first pair of the consistency group, the secondary selection program 309 proceeds to the step S1402, and chooses a secondary PDKC having SVOL which already belongs to the specified consistency group (step S1402). The secondary selection program 309 then proceeds to step S607 and reports the PDKC ID to the caller.

With the technology mentioned above, a use's operation will be specification of global volume ID and application of remote copy functionality. Therefore, the preparation of the SVOL, configuration of remote copy path, and the like become unnecessary.

Figure 28:
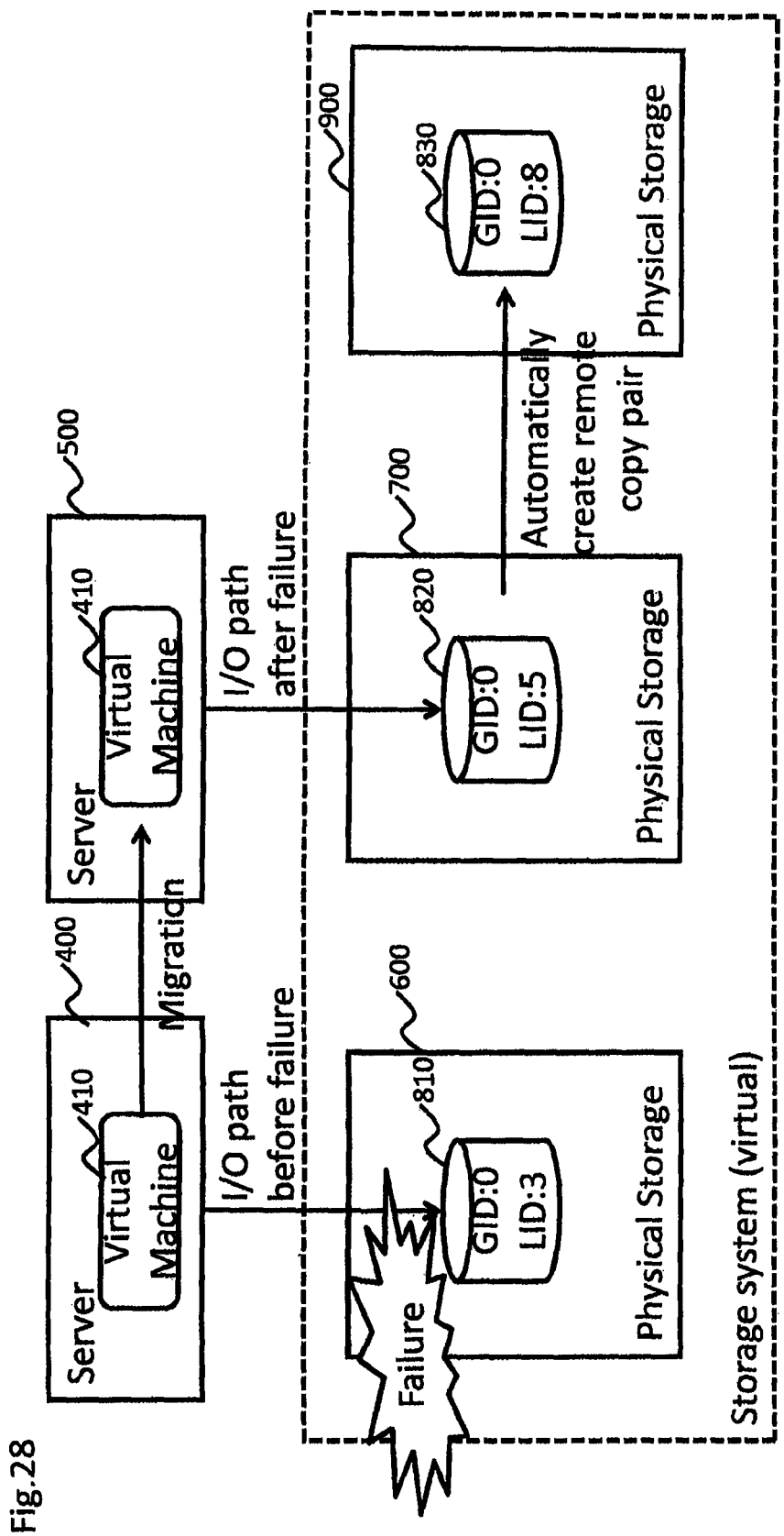
FIG. 28 is a conceptual diagram illustrating an automatic recovery method of remote copy configuration.

FIG. 28 is a conceptual diagram illustrating an automatic recovery method of remote copy configuration. Only differences from FIG. 24 are explained. With the technology illustrated in FIG. 24, after moving of the virtual machine 410 and changing the I/O destination to the volume 820 in the PDKC 700, the computer system is in the status where remote copy is not applied. Thus, reliability is low. The automatic recovery method determines a copy destination automatically based on contents inputted at the initial setting, and restarts the remote copy processing. A third physical storage 900 which is needed for configuration recovery is added as shown in FIG. 28. A volume 830 in the third physical storage 900 is a copy destination of the volume 820 in the PDKC 700 and also has the same global volume ID 0.

Figure 29:
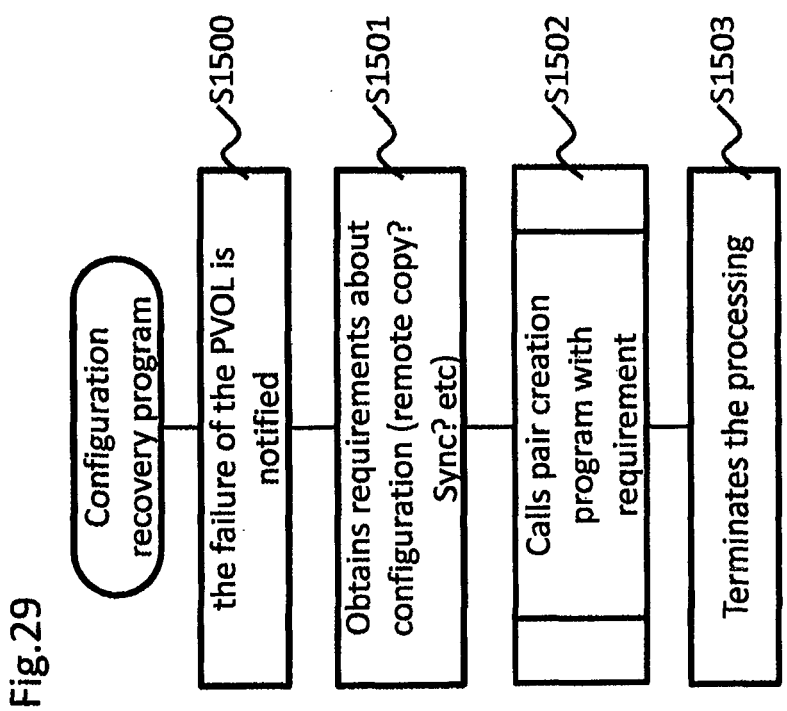
FIG. 29 is an example of a flow diagram illustrating the process flow of a configuration recovery program.

The above processing is achieved by a configuration recovery program in the management server 300, which is illustrated in FIG. 29. The configuration recovery program could be called after step S1301 of the migration site program 312 in FIG. 25. First, the configuration recovery program receives notification of the PVOL or primary PDKC 600 failure (step S1500). The configuration recovery program obtains content of the initial setting for the object volume 820 (step S1501). In the example of FIG. 28, the object volume is a volume having the global volume ID 0. For example, the content is "RC (sync)," "RC (async)," or etc. Then, the configuration recovery program calls the pair creation program 308 with the obtained content (step S1502) and terminates the processing (step S1503).

In the case of the server 400 failure instead of the PDKC 600 failure, the copy destination of remote copy could be PDKC 600. In that case, the volume 820 becomes a copy source volume and the volume 810 becomes a copy destination volume. In general remote copy functionality, only differential data is copied from the volume 820 to the volume 810.

Third Embodiment

The third embodiment is directed to the automatic recovery method of remote copy configuration and the method of applying the above technologies to three data center remote copy configuration. Remote copy functionality supports a combination of synchronous type and asynchronous type of remote copy. Two examples are illustrated in FIG. 30 and FIG. 31.

Figure 30:
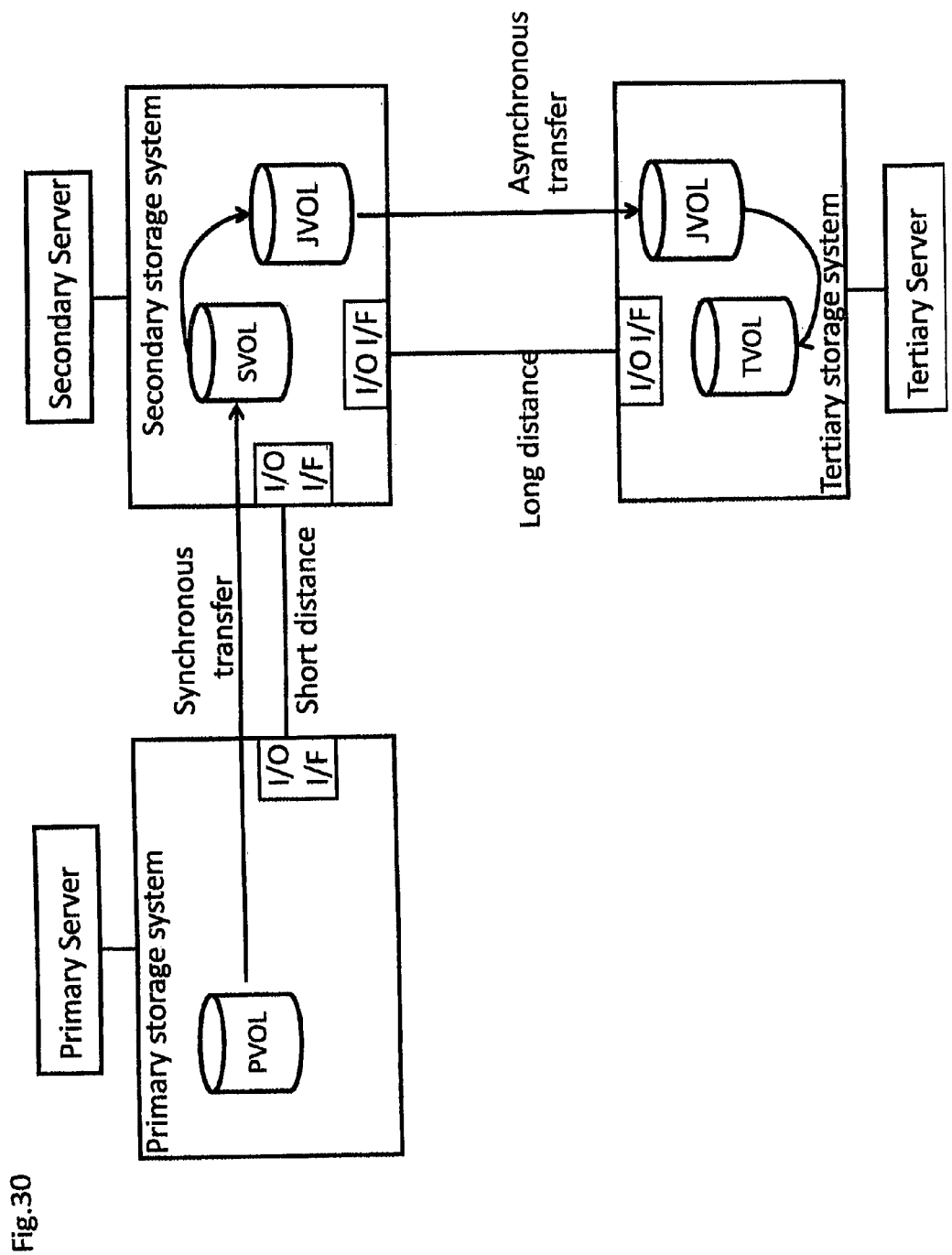
FIG. 30 is a conceptual diagram illustrating a cascading configuration of a three data center remote copy.

FIG. 30 is a conceptual diagram illustrating a cascading configuration of a three data center remote copy. The cascading remote copy copies the data stored in the PVOL to the SVOL synchronously and copies the data stored in SVOL to the TVOL (tertiary volume) asynchronously.

Figure 31:
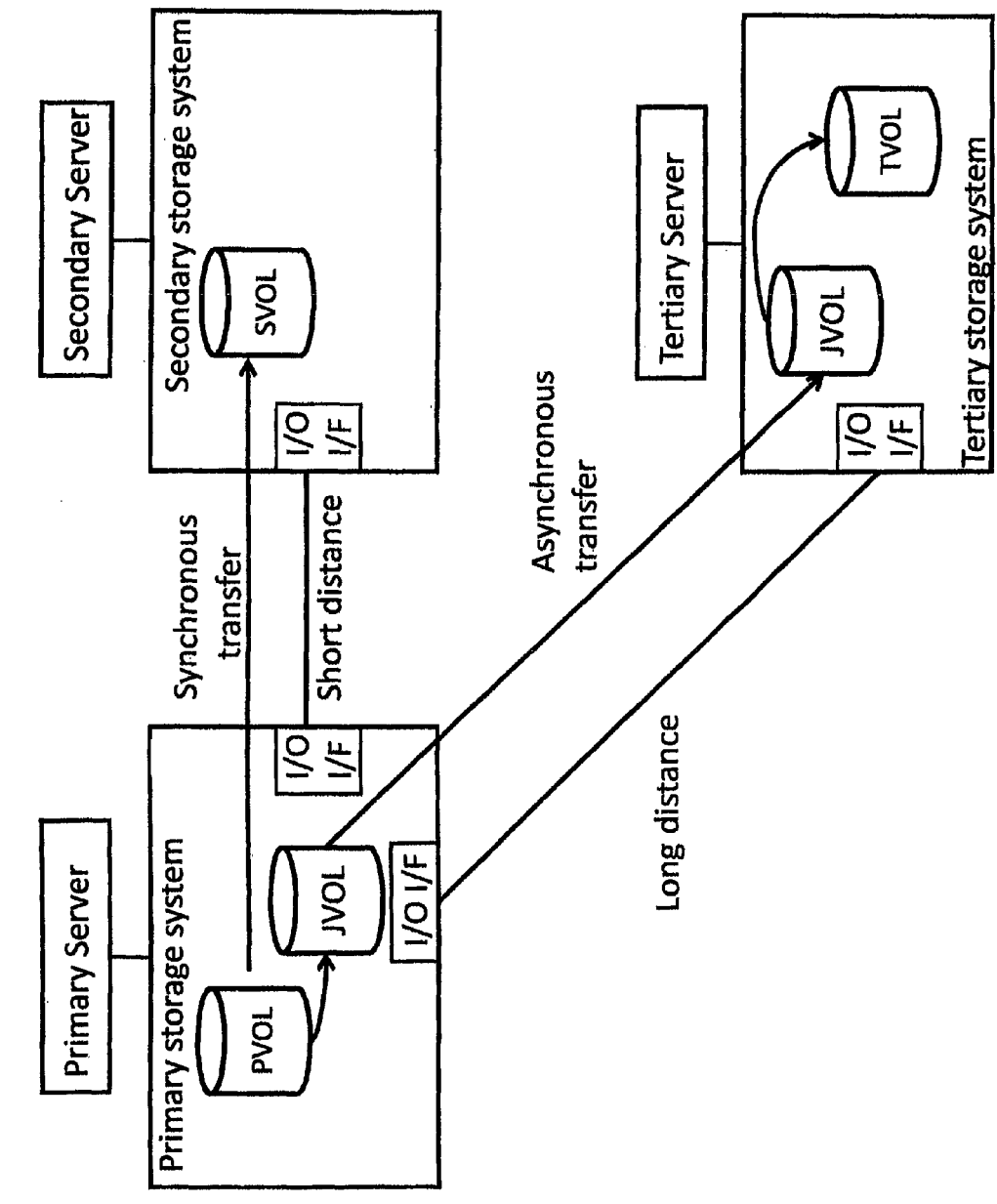
FIG. 31 is a conceptual diagram illustrating a multi target configuration of a three data center remote copy.

FIG. 31 is a conceptual diagram illustrating a multi target configuration of a three data center remote copy. The multi target remote copy copies the data stored in the PVOL to the SVOL synchronously and copies the data store in the PVOL to the TVOL asynchronously.

Cascading and multi target remote copy are simply called 3 data center remote copy (3DC remote copy). These functionalities fulfill both of the no data loss which is a merit of synchronous type, and the shorter response time which is a merit of asynchronous type.

Figure 32:
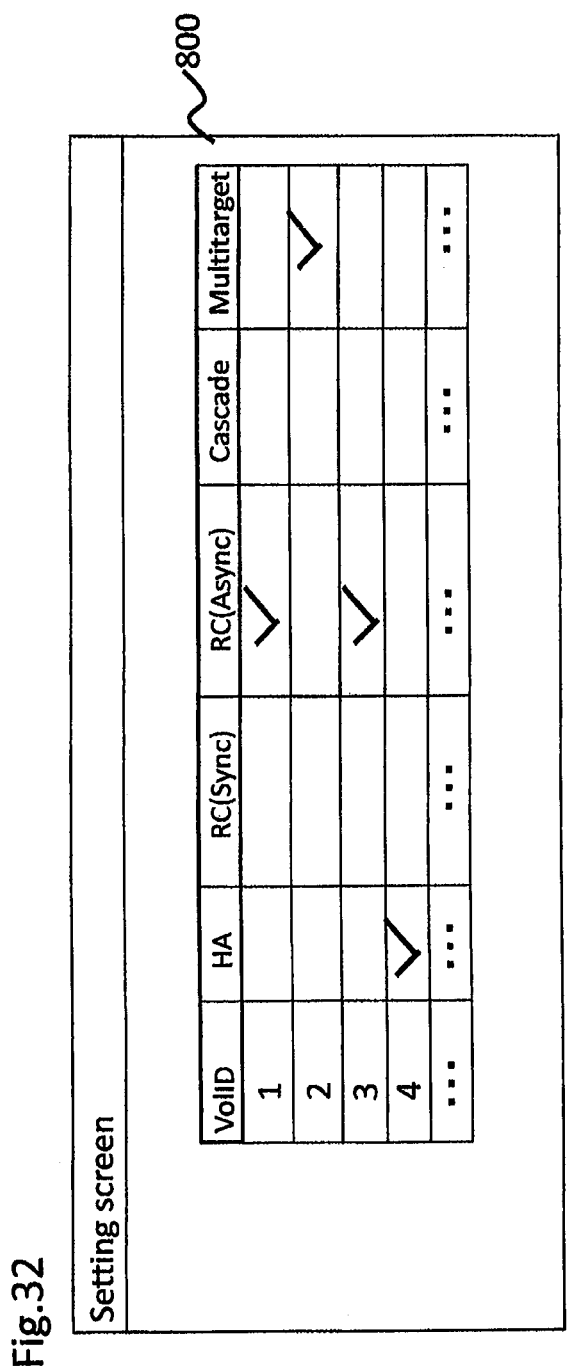
FIG. 32 shows another example of the setting screen for three data center remote copy.

FIG. 32 shows another example of the setting screen 800 for three data center remote copy. Checkboxes for cascading configuration and multi target configuration are added.

Figure 33:
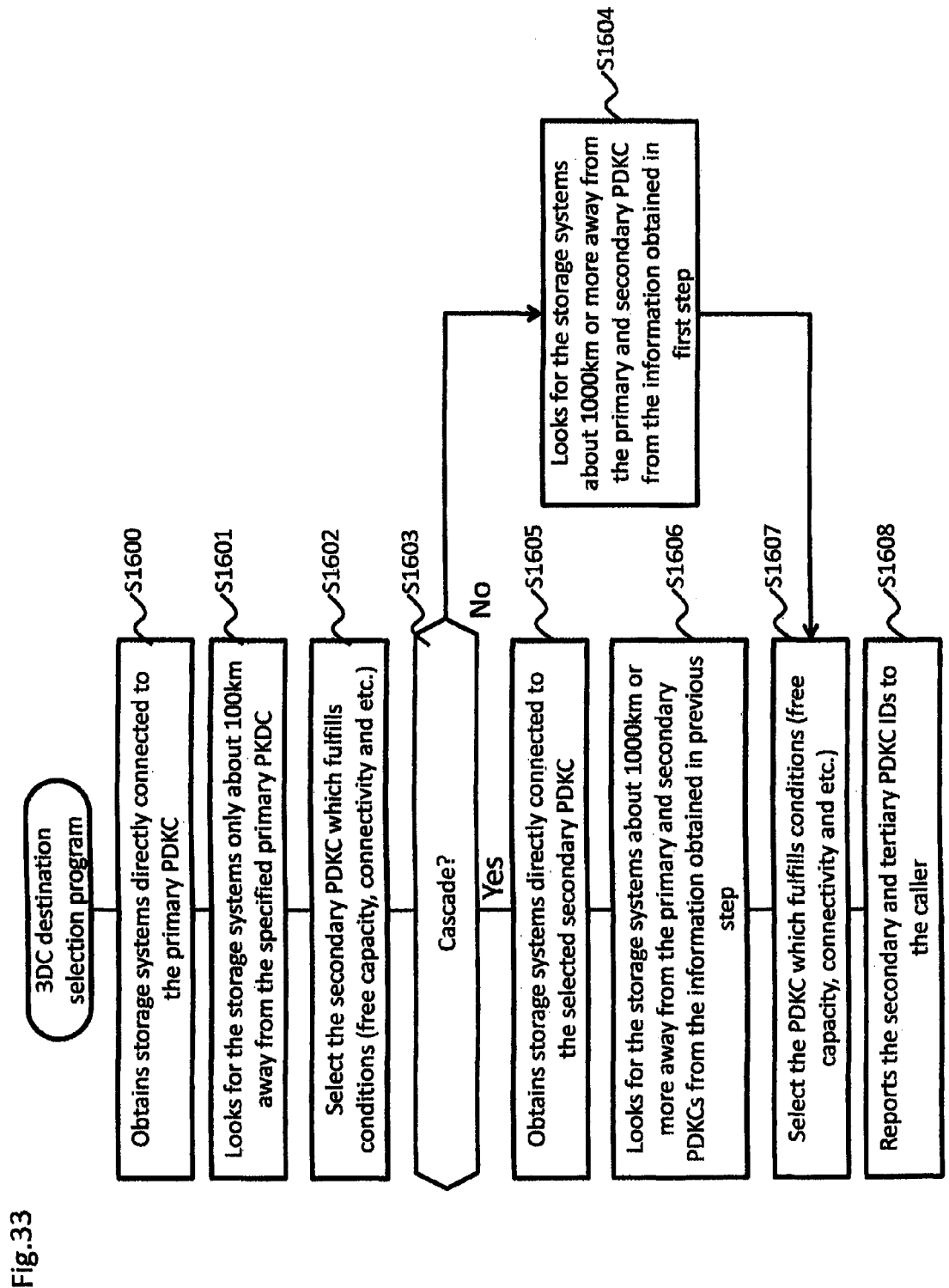
FIG. 33 is an example of a flow diagram illustrating the process flow of a 3 data center destination selection program to determine the copy destination in consideration of 3 data center remote copy.

FIG. 33 is an example of a flow diagram illustrating the process flow of a 3DC destination selection program to determine the copy destination in consideration of 3 data center remote copy. The 3DC destination selection program is called from the pair create program 308 as a result of input to the setting screen 800 of FIG. 32.

In step S1600, the 3DC destination selection program identifies storage systems directly connected to the primary PDKC. This step is the same as step S602 in FIG. 18. Then, the 3DC destination selection program determines the copy destination of synchronous type of remote copy. The 3DC destination selection program looks for the storage systems only about 100 km away from the specified primary PDKC (step 1601), and chooses the secondary PDKC which fulfills the conditions as a synchronous remote copy (step S1602). The 3DC destination selection program confirms whether the specified type is cascade or not (step S1603). If the specified type is not cascade, the 3DC destination selection program looks for the storage systems about 1000 km or more away from the primary and secondary PDKC from the information obtained in step S1600, and then proceeds to step S1607. If the specified type is cascade, the 3DC destination selection program identifies the storage systems directly connected to the selected secondary PDKC (step S1605), and looks for the storage systems about 1000 km or more away from the primary and secondary PDKCs from the information obtained in previous step S1605 (step S1606). In step S1607 (after step S1604 or step S1606), the 3DC destination selection program chooses the PDKC which fulfills the conditions as an asynchronous remote copy. Finally, the 3DC destination selection program reports the secondary and tertiary PDKC IDs to the caller (step S1608).

With the cascading case, the optimal PDKC cannot be detected. Thus, the 3DC destination selection program returns to step S1602 and executes steps S1605 to S1607 again, after choosing the next optimal secondary PDKC.

The steps in FIG. 33 could be executed as a part of the secondary selection program 309 (FIG. 21 or FIG. 27). For example, these steps could be executed after step S1001 in FIG. 27. In that case, the bandwidth between PDKCs and so on are taken into consideration for the 3 data center configuration.

Of course, the system configurations illustrated in FIGS. 1, 8, 9, 24, 26, 28, 30, and 31 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing storage systems including remote copy systems and improving the manageability by automating complicated operations. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:
a plurality of storage systems including a primary storage system and a secondary storage system;
wherein the primary storage system includes a primary volume having a primary local identifier;
wherein the secondary storage system includes a secondary volume having a secondary local identifier which is different from the primary local identifier;
wherein the primary storage system includes a primary storage controller operable, upon receiving a request to create a copy pair between the primary storage system and the secondary storage system, to confirm whether the copy pair can be created and, if yes, send the request to the secondary storage system;
wherein the secondary storage system includes a secondary storage controller operable, upon receiving the request to create the copy pair between the primary storage system and the secondary storage system, to confirm whether the copy pair can be created and, if yes, to update a secondary storage pair information correlating the primary local identifier of the primary volume and the secondary local identifier of the secondary volume as the copy pair; and
wherein the primary volume and the secondary volume have a same global identifier.

2. The system according to claim 1, further comprising:
a computer operable to send the request to create the copy pair between the primary storage system and the secondary storage system and to select the secondary storage system.

3. The system according to claim 2, wherein selecting the secondary storage system comprises, for synchronous remote copy:
Identifying from among the plurality of storage systems one or more storage systems directly connected to the primary storage system; and
choosing from the identified one or more storage systems the secondary storage system which is located away from the primary storage system by at least a preset distance.

4. The system according to claim 2,
wherein selecting the secondary storage system comprises, for asynchronous remote copy, calculating a journal volume size;

wherein the primary storage controller is operable to create a primary journal volume based on the calculated journal volume size; and wherein the secondary storage controller is operable to create a secondary journal volume based on the calculated journal volume size.

5. The system according to claim 2, wherein the computer is operable to select the secondary storage system based on input setting by a user which specifies whether the request to create the copy pair is for synchronous remote copy or asynchronous remote copy.

6. The system according to claim 2, wherein the computer is operable to send a request to the primary storage controller to create a volume in the primary storage system for the copy pair and to send a request to the secondary storage controller to create a volume in the secondary storage system for the copy pair.

7. The system according to claim 6, wherein the primary storage controller is operable to create the primary volume in response to the request to create a volume in the primary storage system for the copy pair; and wherein the secondary storage controller is operable to create the secondary volume in response to the request to create a volume in the secondary storage system for the copy pair.

8. The system according to claim 6, wherein the computer is operable to receive a volume size parameter, to identify one or more storage systems, from among the plurality of storage systems, which have sufficient free space based on the volume size parameter, and to select the primary storage system from the identified one or more storage systems.

9. The system according to claim 8, wherein, if two or more storage systems are identified, the computer is operable to select the primary storage system having a largest free space.

10. The system according to claim 8, wherein, if two or more storage systems are identified, the computer is operable to select the primary storage system having a lowest load.

11. A method for creating a copy pair between a primary storage system including a primary volume having a primary local identifier and a secondary storage system including a secondary volume having a secondary local identifier, from among a plurality of storage systems, the method comprising:

upon receiving by the primary storage system, a request to create a copy pair between the primary storage system and the secondary storage system, confirming whether the copy pair can be created and, if yes, send the request to the secondary storage system; and upon receiving by the secondary storage system, the request to create the copy pair between the primary storage system and the secondary storage system, to confirm whether the copy pair can be created and, if yes, to update a secondary storage pair information correlating the primary local identifier of the primary volume and the secondary local identifier of the secondary volume as the copy pair;

wherein the primary volume and the secondary volume have a same global identifier.

12. The method according to claim 11, further comprising:

sending to the primary storage system, by a computer, the request to create the copy pair between the primary storage system and the secondary storage system and selecting the secondary storage system.

13. The method according to claim 12, wherein selecting the secondary storage system comprises, for synchronous remote copy:

identifying from among the plurality of storage systems one or more storage systems directly connected to the primary storage system; and choosing from the identified one or more storage systems the secondary storage system which is located away from the primary storage system by at least a preset distance.

14. The method according to claim 12, wherein selecting the secondary storage system comprises, for asynchronous remote copy, calculating a journal volume size; the method further comprising:

creating a primary journal volume, by the primary storage system, based on the calculated journal volume size; and creating a secondary journal volume, by the secondary storage system, based on the calculated journal volume size.

15. The method according to claim 12, wherein the secondary storage system is selected based on input setting by a user which specifies whether the request to create the copy pair is for synchronous remote copy or asynchronous remote copy.

16. The method according to claim 12, further comprising:

sending, by the computer, a request to the primary storage system to create a volume in the primary storage system for the copy pair and a request to the secondary storage system to create a volume in the secondary storage system for the copy pair.

17. The method according to claim 16, further comprising:

creating the primary volume, by the primary storage system, in response to the request to create a volume in the primary storage system for the copy pair; and creating the secondary volume, by the secondary storage system, in response to the request to create a volume in the secondary storage system for the copy pair.

18. The method according to claim 16, further comprising:

receiving, by the computer, a volume size parameter, identifying one or more storage systems, from among the plurality of storage systems, which have sufficient free space based on the volume size parameter, and selecting the primary storage system from the identified one or more storage systems.

19. The method according to claim 18, further comprising:

if two or more storage systems are identified, selecting the primary storage system having a largest free space.

20. The method according to claim 18, further comprising:

if two or more storage systems are identified, selecting the primary storage system having a lowest load.

* * * * *